United States Patent
Beskales et al.

(10) Patent No.: US 11,294,937 B1
(45) Date of Patent: Apr. 5, 2022

(54) METHOD AND COMPUTER PROGRAM PRODUCT FOR PRODUCING A RECORD CLUSTERING WITH ESTIMATED CLUSTERING ACCURACY METRICS WITH CONFIDENCE INTERVALS

(71) Applicant: Tamr, Inc., Cambridge, MA (US)

(72) Inventors: George Anwar Dany Beskales, Waltham, MA (US); Alexandra V. Batchelor, Cambridge, MA (US); Brian A. Long, Somerville, MA (US)

(73) Assignee: TAMR, INC., Cambridge, MA (US)

( * ) Notice: Subject to any disclaimer, the term of this patent is extended or adjusted under 35 U.S.C. 154(b) by 0 days.

(21) Appl. No.: 17/493,491

(22) Filed: Oct. 4, 2021

(51) Int. Cl.
*G06F 16/00* (2019.01)
*G06F 16/28* (2019.01)
*G06F 16/23* (2019.01)

(52) U.S. Cl.
CPC ........ *G06F 16/285* (2019.01); *G06F 16/2365* (2019.01)

(58) Field of Classification Search
CPC .......................... G06F 16/285; G06F 16/2365
See application file for complete search history.

(56) References Cited

U.S. PATENT DOCUMENTS

| | | | |
|---|---|---|---|
| 9,280,593 B1 * | 3/2016 | Dykstra | G06F 16/285 |
| 10,613,785 B1 | 4/2020 | Beskales et al. | |
| 10,664,719 B2 * | 5/2020 | Lin | G06K 9/6276 |
| 11,049,028 B1 | 6/2021 | Beskales et al. | |
| 2010/0169343 A1 * | 7/2010 | Kenedy | G06F 16/9535 707/758 |
| 2019/0303471 A1 * | 10/2019 | Lee | G06F 16/285 |
| 2020/0012886 A1 * | 1/2020 | Walters | G06F 16/254 |
| 2022/0004565 A1 | 1/2022 | Webber et al. | |

FOREIGN PATENT DOCUMENTS

WO    WO-2016184498 A1 *  11/2016  ........... G06K 9/6247

OTHER PUBLICATIONS

Shan, Guogen. "Accurate confidence intervals for proportion in studies with clustered binary outcome." Statistical methods in medical research 29.10 (2020): 3006-3018.*

Salehi, Mohammad, et al. "Empirical likelihood confidence intervals for adaptive cluster sampling." Environmental and ecological statistics 17.1 (2010): 111-123.*

Christen et al., "A Parallel Open Source Data Linkage System," Proceedings of the 8th Pacific-Asia Conference, PAKDD 2004, Sydney, Australia, Springer Lecture Notes in Artificial Intelligence, vol. 3056, pp. 638-647 (May 26-28, 2004).

(Continued)

*Primary Examiner* — Nan Hutton
(74) *Attorney, Agent, or Firm* — Panitch Schwarze Belisario & Nadel LLP

(57) ABSTRACT

A method is provided for producing a record clustering with estimated accuracy metrics with confidence intervals. These metrics can be used to determine whether a clustering should be accepted as the output of the system, and whether model training is necessary to meet desired clustering accuracy. A collection of test records is used in the process, wherein each test record is a member of a collection of input records.

14 Claims, 14 Drawing Sheets

(56) References Cited

OTHER PUBLICATIONS

Maidasani et al., "Entity Resolution Evaluation Measures," Department of Computer Science, University of Maryland, College Park, Maryland, 24 pages (May 17, 2012).

Rice, J., "Mathematical Statistics and Data Analysis," vol. 12, No. 53, University of California, Berkeley 3rd Edition, pp. 199-254, (2006) (Chapter 7, "Survey Sampling," Section 7.5, "Stratified Random Sampling," pp. 227-238, 2006).

Vitter, J. S., "Random Sampling with a Reservoir," ACM Transactions on Mathematical Software, vol. 11, No. 1, pp. 37-57 (Mar. 1, 1985).

Wikipedia entry for "Rand Index." downloaded from web page: <https://en.wikipedia.org/wiki/Rand_index>, last edited date: Jun. 5, 2021, 4 pages.

* cited by examiner

Figure 1: Workflow for entity resolution with record-based clustering metrics

Figure 2: Workflow for producing a record clustering with record-based clustering metrics

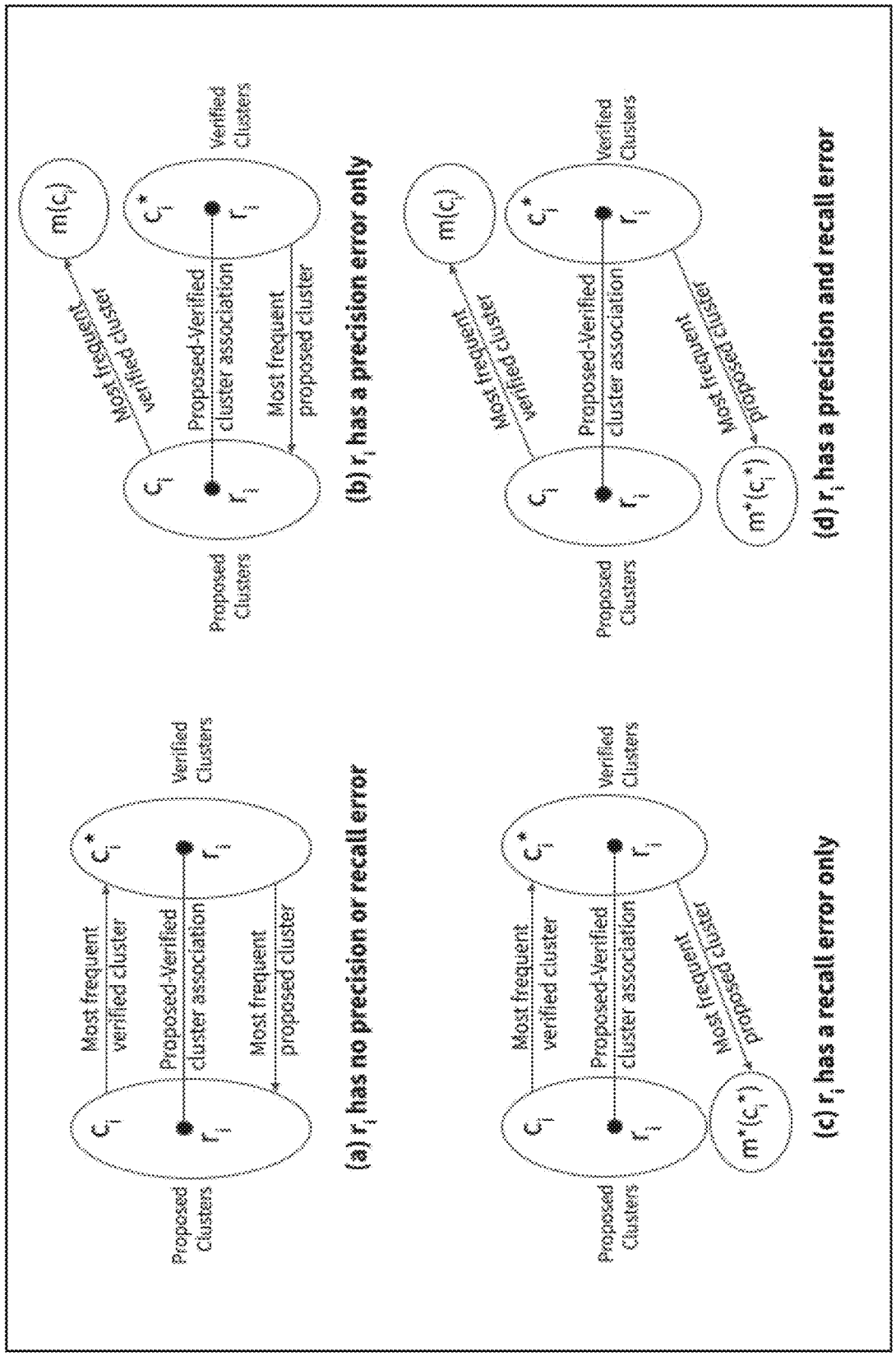
Figure 6: Record-based precision and recall

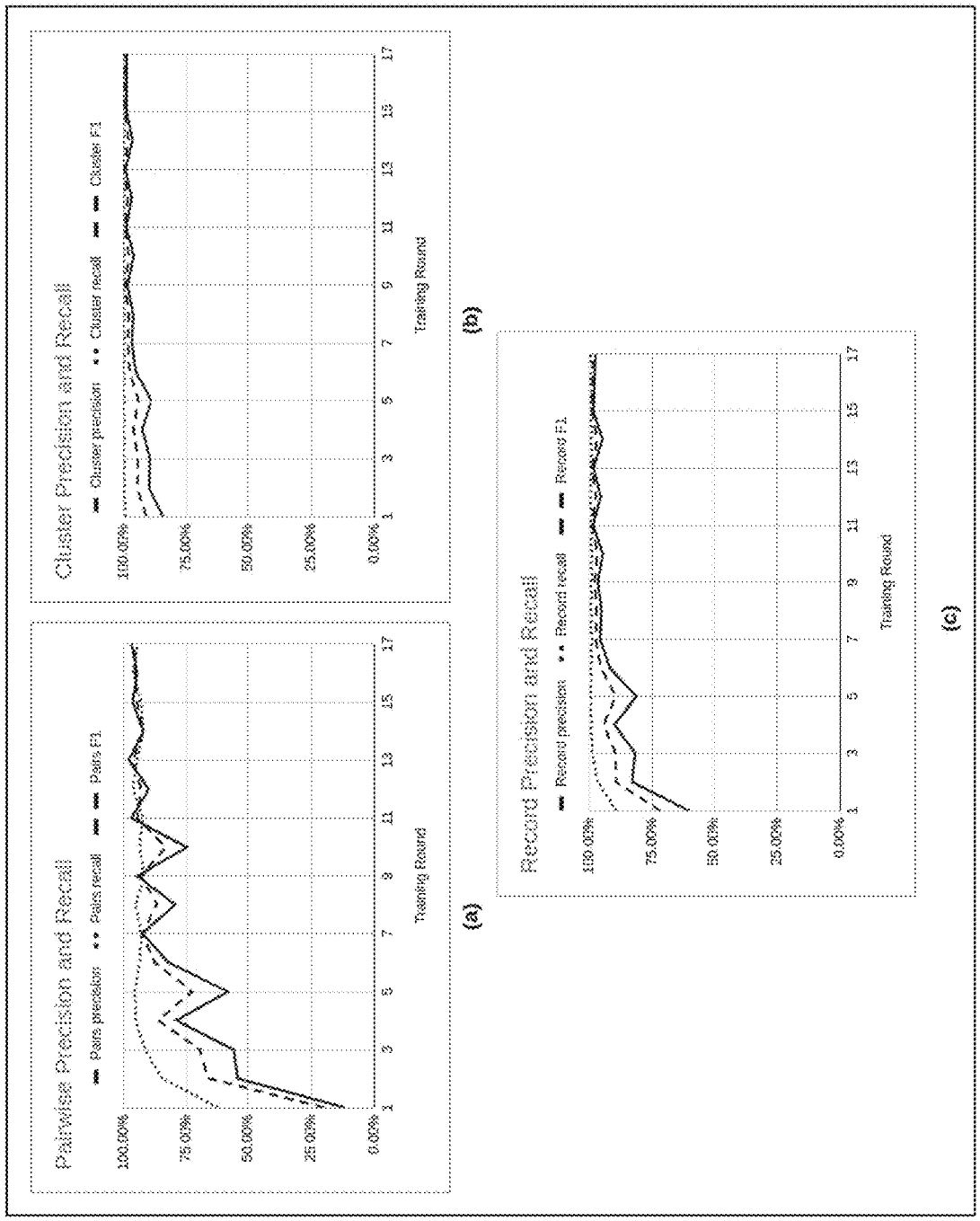
Figure 7: Evaluation of Record-Based Clustering Metrics

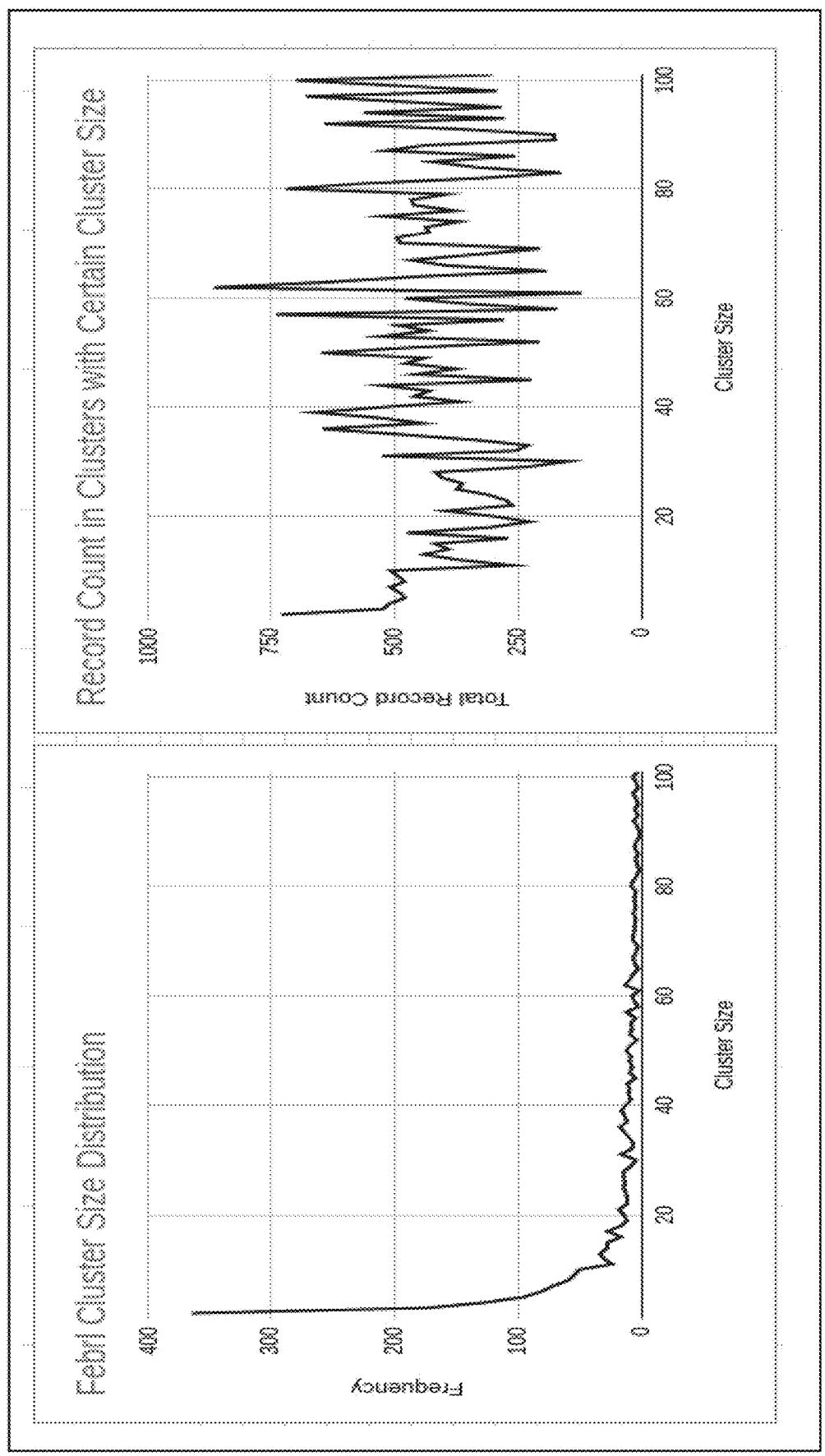
Figure 8: Cluster Size and Record Count Distributions in Febrl Dataset

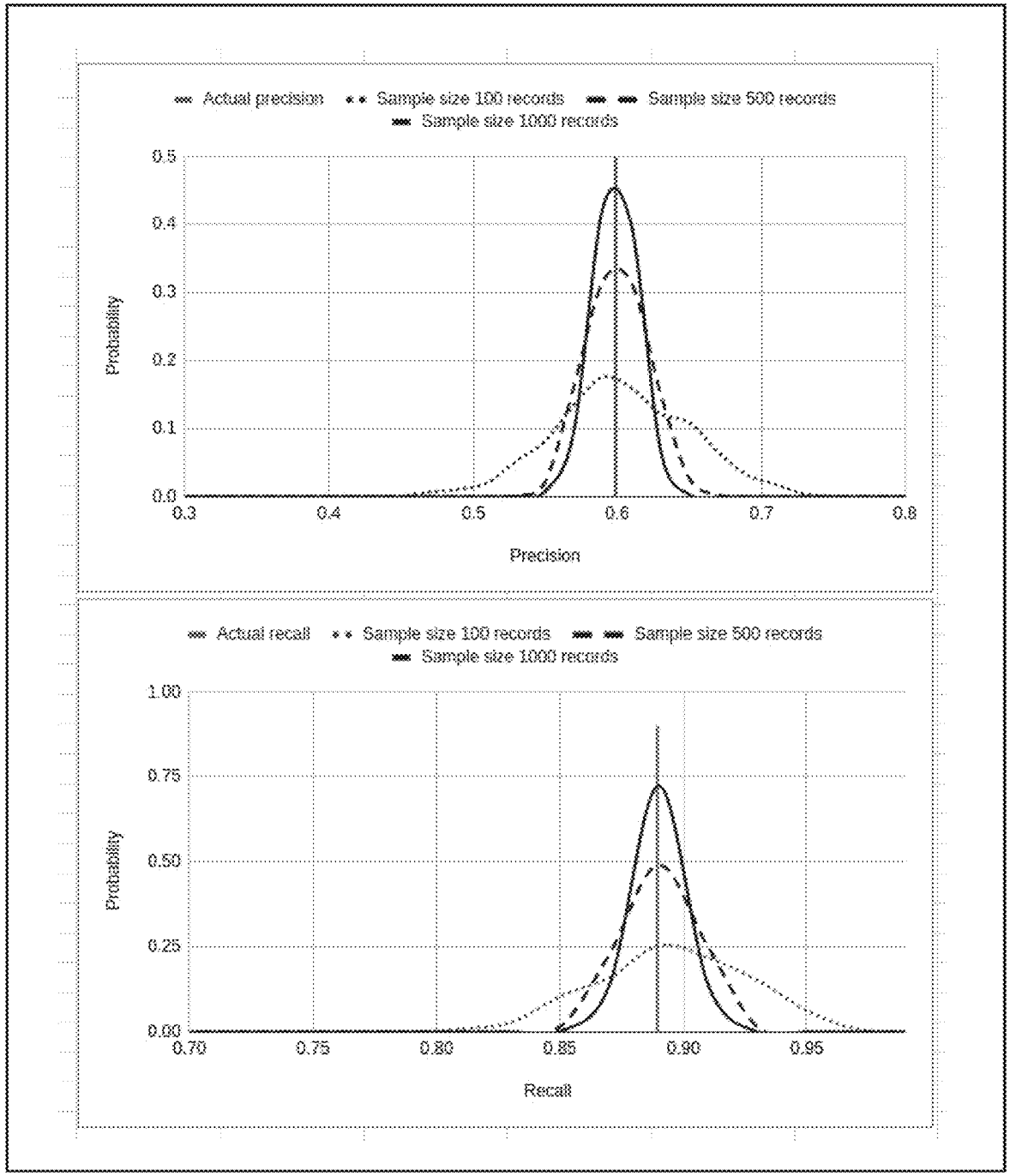
Figure 9: Precision and Recall Estimates Distribution

Figure 10: Verification User Interface

Figure 11: Filters User Interface

Figure 12: Sort User Interface

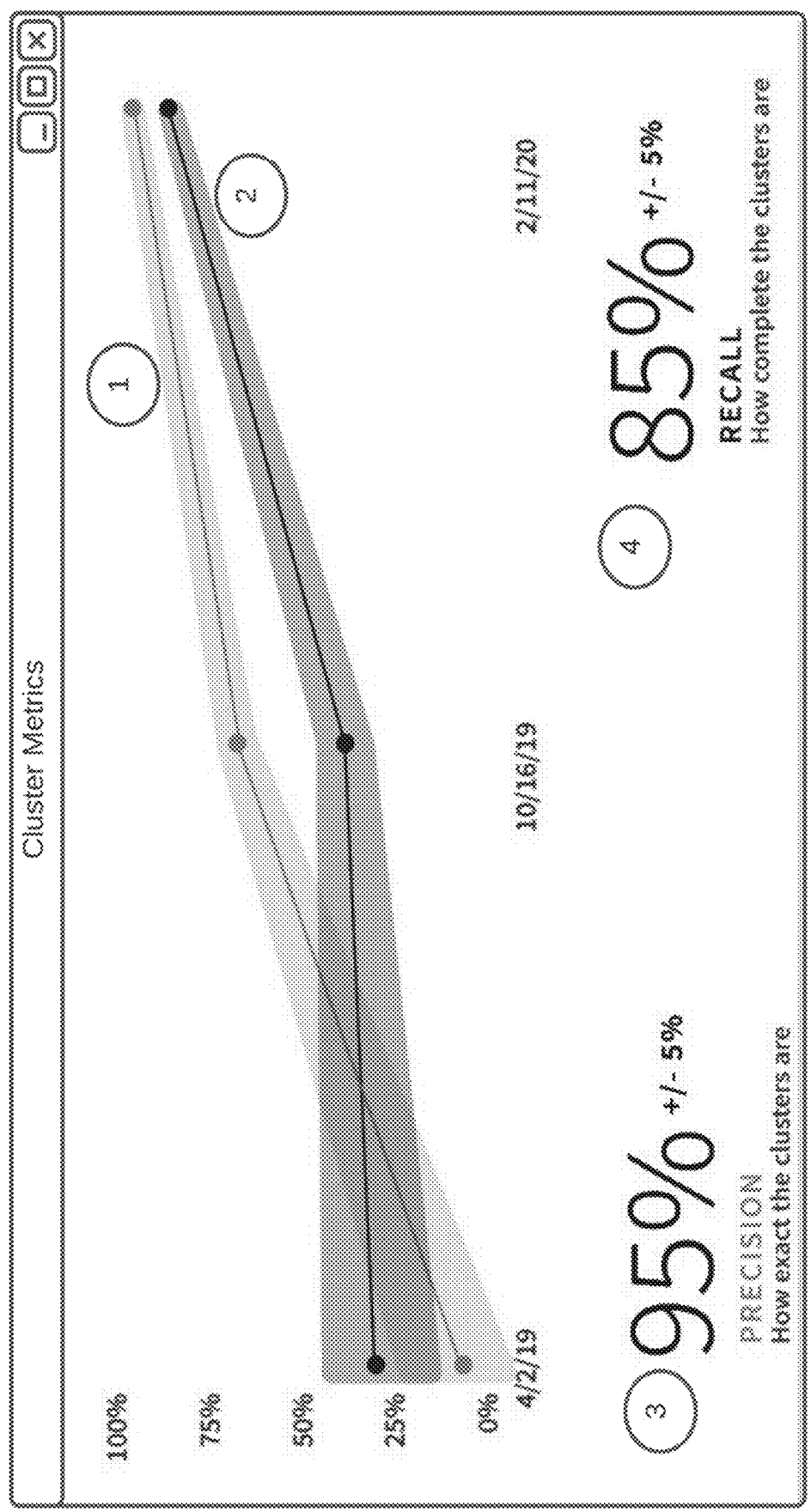
Figure 13: Cluster Metrics

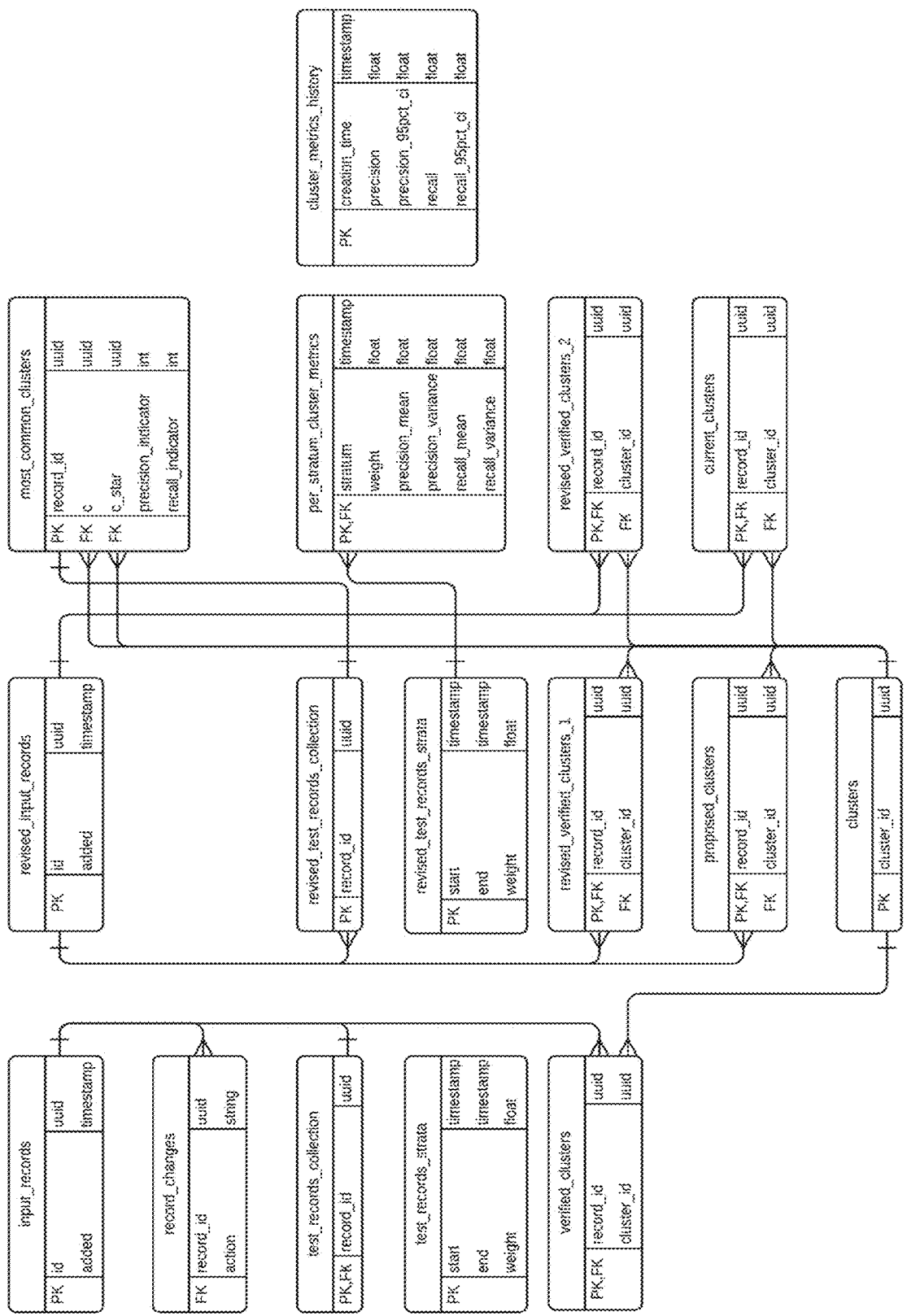
Figure 14: Entity Relationship Diagram

METHOD AND COMPUTER PROGRAM PRODUCT FOR PRODUCING A RECORD CLUSTERING WITH ESTIMATED CLUSTERING ACCURACY METRICS WITH CONFIDENCE INTERVALS

COPYRIGHT NOTICE AND AUTHORIZATION

Portions of the documentation in this patent document contain material that is subject to copyright protection. The copyright owner has no objection to the facsimile reproduction by anyone of the patent document or the patent disclosure as it appears in the Patent and Trademark Office file or records, but otherwise reserves all copyright rights whatsoever.

BACKGROUND OF THE INVENTION

In the domain of entity resolution, entity resolution in large datasets (millions to billions of records or more, often referred to as "big data") can be performed using machine learning. Constructing a machine learning model ("training") is typically an iterative process, where at the end of each iteration the accuracy of the proposed clustering produced by the model is assessed to determine whether it meets established goals, or whether additional training is needed in order to address some deficiency. Furthermore, once the model is deployed into production, the accuracy of the clustering produced by the model as data changes must be monitored to ensure that it continues to meet established goals. If the accuracy of the clustering fails to meet the goals, then training must be done in order to address the deficiency.

Previous efforts have shown how clustering accuracy can be assessed using a test dataset composed of labeled examples. These efforts have shown that existing methods of assessing clustering accuracy are subject to the following limitations:
1. Pair-based accuracy metrics are prone to bias due to the effects of cluster size.
2. Cluster-based accuracy metrics are both prone to bias due to the effects of cluster size, and lack any agreed upon method of handling partially-correct clusters.
3. Record-based accuracy metrics fail to give sufficient information to guide successive training.
4. Clustering accuracy metrics typically require many costly labels in order to be computed with a useful degree of accuracy.
5. Existing methods of constructing a test dataset are prone to bias due to the omission of pairs due to pair generation, or due to cluster size.
6. Existing methods of re-assessing clustering accuracy in the face of data changes require costly updates to the test dataset.

The present invention addresses each of these limitations.

BRIEF SUMMARY OF THE INVENTION

Preferred embodiments of the present invention provide a method and system for efficiently maintaining a test dataset of partial ground truth, and using this in conjunction with a proposed clustering to compute estimated accuracy of the proposed clustering with confidence intervals. These metrics can be used to determine whether a clustering should be accepted as the output of the system, and whether model training is necessary to meet desired clustering accuracy.

BRIEF DESCRIPTION OF THE DRAWINGS

Preferred embodiments of the present invention will now be described by way of example with reference to the accompanying drawings:

FIGS. 3-9 show graphical results that are related to the present invention.

Figure 11:
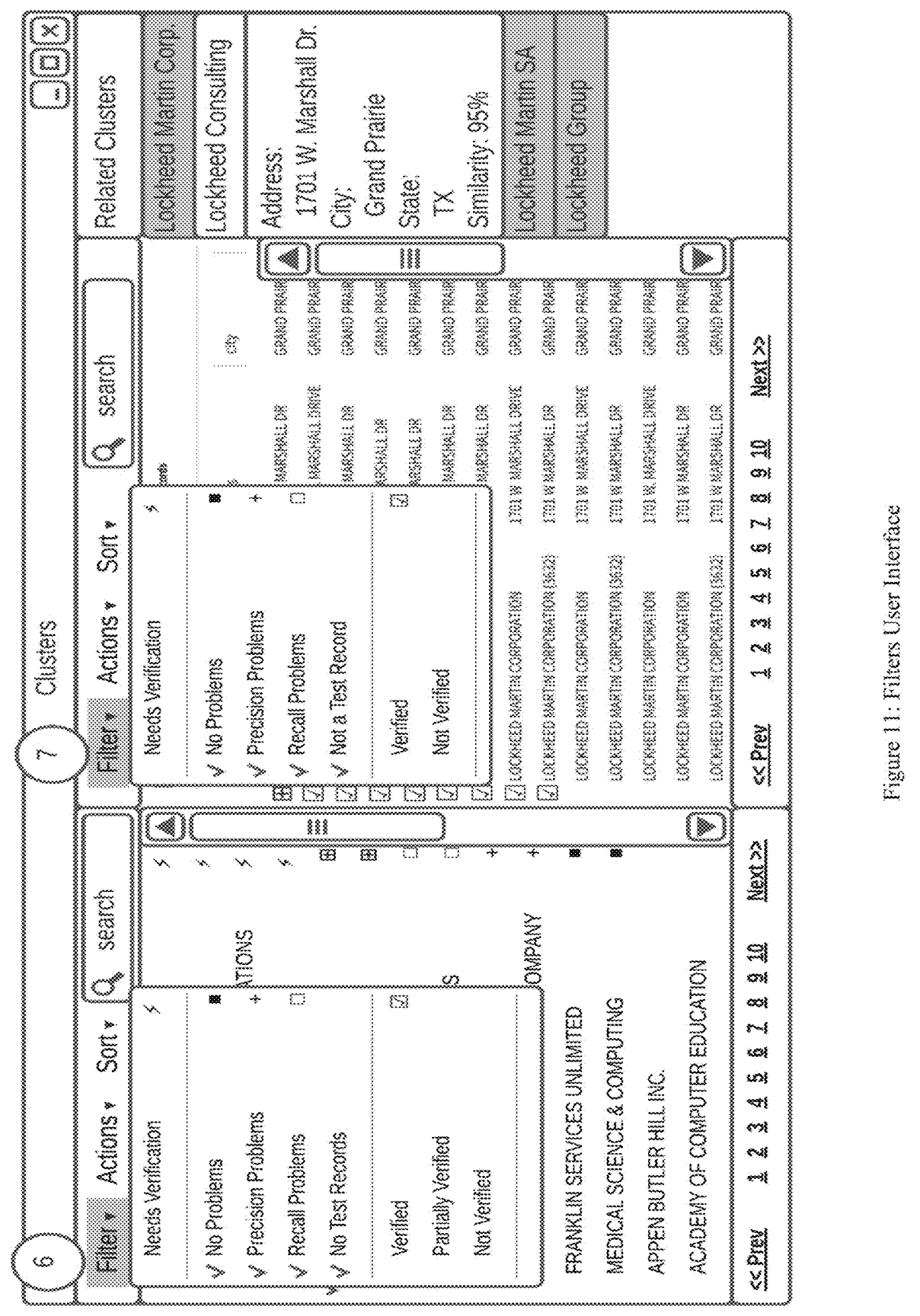
Figure 12:
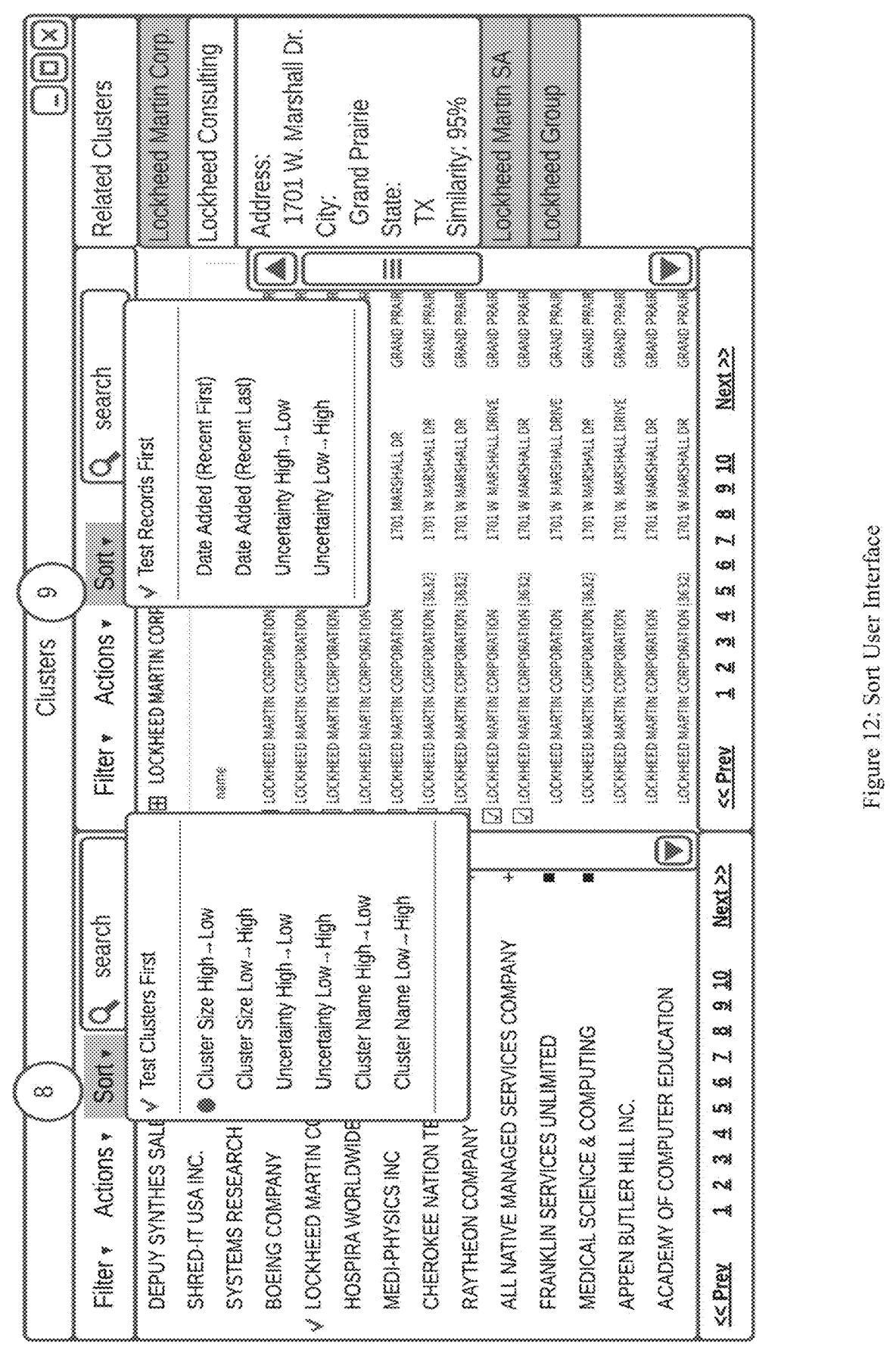

FIGS. 10-12 are user interface displays in accordance with preferred embodiments of the present invention.

FIG. 13 show cluster metrics when using preferred embodiments of the present invention.

FIG. 14 is an entity relationship diagram (ERD) in accordance with one preferred embodiment of the present invention.

DETAILED DESCRIPTION OF THE INVENTION

Figure 1:
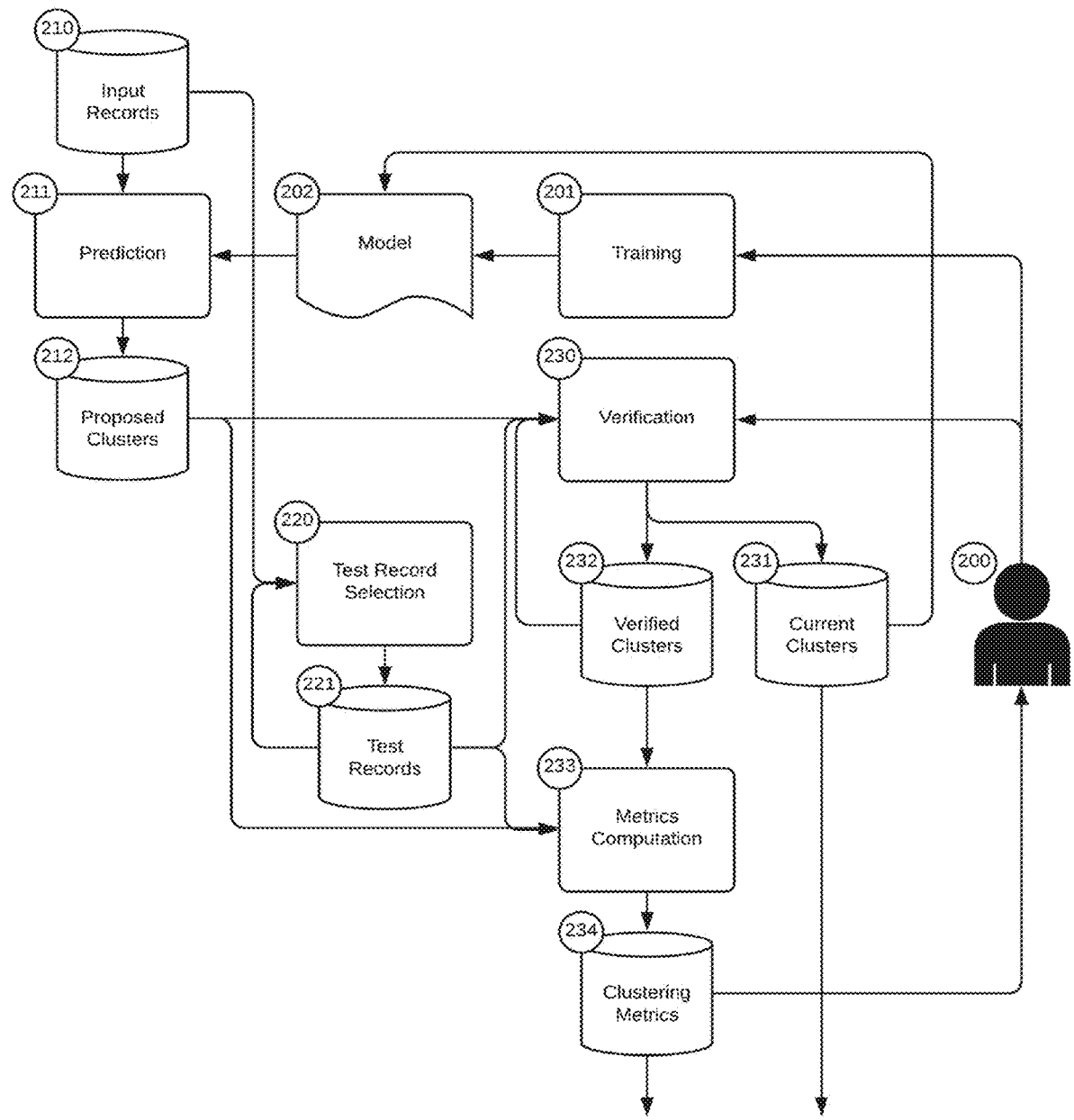
FIGS. 1-2 are flowcharts in accordance with preferred embodiments of the present invention.

Certain terminology is used herein for convenience only and is not to be taken as a limitation on the present invention. The words "a" and "an", as used in the claims and in the corresponding portions of the specification, mean "at least one."

I. Terminology and Definitions

The following terminology and definitions are provided to promote understanding of the present invention. The terminology and definitions of the prior art are not necessarily consistent with the terminology and definitions of the present invention. Where there is conflict, the following terminology and definitions apply.

Cluster: the set of records with the same cluster membership in a dataset, and metadata pertaining to and linked to that set of records.

Test Record: a record selected for use when computing clustering metrics

Test Cluster: a cluster with at least one test record as a member

Ground Truth: records with cluster membership that is known to be correct

II. Detailed Disclosure

1. Existing Entity Resolution Workflows Incorporating Clustering Accuracy Metrics Previous efforts have shown how the accuracy of the clustering produced by a machine learning model can be assessed using a test dataset composed of labeled examples. Three metrics are commonly used: precision, which identifies over-clustering; recall, which identifies under-clustering; and $F_1$ score, which is an aggregate accuracy metric combining precision and recall. During training or monitoring, when precision is below the desired threshold, this indicates that the system is clustering unrelated entities together, and additional training should be done to teach the system to better distinguish entities. When recall is below the desired threshold, this indicates that the system is failing to cluster related entities together, and additional training should be done to teach the system to better identify related entities.

In production, datasets change continually through the addition, deletion, and update of records, and new models may need to be developed and deployed in response to changing data or business needs. Therefore, metrics must be re-computed to track changes in clustering accuracy over time. This practice is known as "model monitoring."

Model Monitoring is Challenging Because:
1. Dataset changes may not be evenly distributed throughout the dataset. For the estimated clustering metrics to be valid, the collection of verified records must be updated in response to data changes so that it continues to represent a uniform random sample from the modified dataset.
2. Verification requires substantial effort and should therefore be minimized to only that which is necessary to keep the metrics valid. This makes it desirable to retain and use existing verification to the greatest extent possible when updating the sample of test records.

Many workflows and methods of computing clustering accuracy metrics exist. There are three general types—pair-based, cluster-based, and edit-distance—each with significant shortcomings.

The following sections provide a brief overview of these metric types, the workflows used to produce and maintain them, and of their shortcomings.

In the following descriptions of clustering accuracy metrics, let $C=\{(r_1, c_1), \ldots, (r_n, c_p)\}$ be a proposed clustering of records $\{r_1, \ldots, r_n\}$ and $C^*=\{(r_1, c_1^*), \ldots, (r_n, c_q^*)\}$ be the ground truth clustering as determined by the system generating the data or by having experts verify a clustering of the same set of records. In order to measure the accuracy of C with respect to C*, one can use any of the following methods.

1.1. Pair-Based Metrics

The test dataset for pair-based clustering accuracy metrics consists of record pairs with a "match" or "non-match" label. When performing entity resolution in large datasets, the number of possible record pairs makes it impractical to work with all pairs, and a method must be employed to identify a subset of record pairs to use for entity resolution. This practice is called "pair generation," and the subset of pairs produced by pair generation is the generated pairs. All pair-based metrics have challenges, and pair-based metrics in workflows with pair generation introduce additional challenges:
(i) Pair-based metrics do not account for any errors or corrections that occur during the clustering step, and may therefore under- or over-report accuracy.
(ii) The generated pairs are biased towards matching pairs—pairs that are predicted to receive a "match" label. This bias is difficult or impossible to account for when selecting a test dataset and computing pair-based clustering accuracy metrics using that test dataset.
(iii) Pair generation is very sensitive to the method and parameters used to generate pairs, and to the distribution of values in the dataset. If any of these changes, the distribution of pairs is likely to change, resulting in altered bias in the generated pairs. This change in bias is difficult or impossible to account for when maintaining a test dataset and computing metrics.
(iv) Although pair-based precision, recall, and F1 are well-defined, as are methods of computing clustering metrics using pairs, such as the Rand Index, these approaches are biased towards large clusters and fail to count singleton clusters (which have no internal pairs), resulting in skewed accuracy metrics.
(v) Pair-based metrics encounter scale challenges on big data where large clusters with, for example, hundreds of thousands of records form extremely large connected components in the connectedness graph of generated pairs.

1.2. Cluster-Based Metrics

The test dataset for cluster-based metrics consists of clusters. In this context, a cluster is a set of records with the same cluster membership, where the set of records with the same cluster membership in the test dataset is complete and accurate. In an entity resolution workflow, the clusters used for test are selected from the clusters produced by the system.

Metrics such as cluster precision and recall, closest cluster, modularity-based user-centric (MUC), and Constrained Entity-Alignment F-Measure (CEAF) compute metrics directly on clusters.

These metrics avoid potential bias towards large clusters by treating all clusters equally. However, they exhibit other issues such as the following:
(i) Over-weighting singleton clusters. In many real-world scenarios, more than 80% of clusters are singletons, with those singletons containing fewer records in aggregate (<50%) than the multi-record clusters. Since singleton clusters in C have 100% precision and singleton clusters in C* have 100% recall, these metrics overestimate clustering accuracy in these common cases.
(ii) Poor handling of partially-correct clusters. The cluster-based metrics listed above describe very different handling of partially-correct clusters, each of which has been demonstrated to either over- or under-represent accuracy in real-world use cases.
(iii) High maintenance cost for the test dataset. Clustering metrics require that clusters in the test dataset be complete and accurate, so if any record that is a member of any of these clusters is added, modified, or deleted, the test dataset must be updated before metrics can be re-computed. Record additions are particularly challenging, as each record added to the system must be examined to determine whether it is a member of a cluster in the test dataset in order to avoid introduction of false accuracy in recall.

1.3. Edit-Distance Based Metrics

The test dataset for edit-distance-based metrics consists of ground truth, which contains the correct cluster membership for each record. These metrics count the number of records whose cluster membership needs to be changed in order to make C and C* equal.
(i) No distinction between membership changes due to precision problems and membership changes due to recall problems. Although edit-distance based metrics can provide an overall assessment of whether clustering accuracy falls below a desired threshold, they do not indicate whether the deficiency is due to over- or under-clustering. This imposes the burden of analysis to determine the nature of the deficiency on an operator when seeking to correct it.
(ii) High maintenance cost for the test dataset. Edit-distance metrics require that cluster membership in the test dataset be complete and accurate, so if any record that is a member of any of these clusters is added, modified, or deleted from the system, the test dataset must be updated before metrics can be re-computed. Record additions are particularly challenging, as each record added to the system must be examined to determine whether it is a member of a cluster in the test dataset in order to avoid introduction of false accuracy.

2. Workflow for Producing a Record Clustering with Record-Based Clustering Metrics What is desired is a method and system to produce a record clustering and accurately and efficiently estimate the accuracy of that clustering. This system should fit into the context of the training workflow for entity resolution, and the production workflow for entity resolution. What follows is such a workflow.

For this workflow to produce clustering metrics, it requires a collection of records to have their cluster membership to be verified as correct so they can be used as a basis for assessing the accuracy of a clustering. This requires a method of identifying the records to be verified, a definition of clustering accuracy metrics, and a method of producing the desired metrics using the verified records.

FIG. 1 presents the high-level workflow for entity resolution incorporating record-based clustering metrics. This workflow is:

1. Model Creation
   1.1. An operator (200) uses a training (201) method such as supervised or unsupervised learning to create a model (202) that is used to predict cluster membership for input records. This model uses any existing record clustering (231) to aid in prediction.
2. Clustering
   2.1. The model (202) is used to predict (211) the cluster membership for each of the records (210), producing proposed clusters (212).
3. Verification
   3.1. Test record selection (220) examines any current test records (221) and the input records (212) to determine whether and how to add records to test records (221).
   3.2 Verification (230) presents the proposed clusters (212), including proposed clusters whose members include test records (221), and verified records (232) to the operator (200). The operator corrects the clusters for the test records, producing current clusters (231) and verified records (232). This process of working with proposed clusters which replace current clusters is described in U.S. patent application Ser. No. 16/706,086, now U.S. Patent Application Publication No. 2022-0004565 (Webber et al.), which is incorporated by reference herein, and thus is not described in any further detail herein.
4. Metrics Computation
   4.1. Metrics computation (233) uses the proposed clusters (212), test records (221), and verified records (232) to compute clustering metrics (234).
5. Model Assessment
   5.1. The operator (200) examines the clustering metrics (223) to determine whether the model is producing clusters with the desired accuracy. If so, then the operator (200) can accept the current clusters (231) as the output of the system, using the clustering metrics (234) to describe the accuracy of the current clusters; otherwise, the operator (200) uses the clustering metrics (233) to guide additional training (201) to address under-clustering or over-clustering in the current clusters (231), and repeats the workflow.

Figure 2:
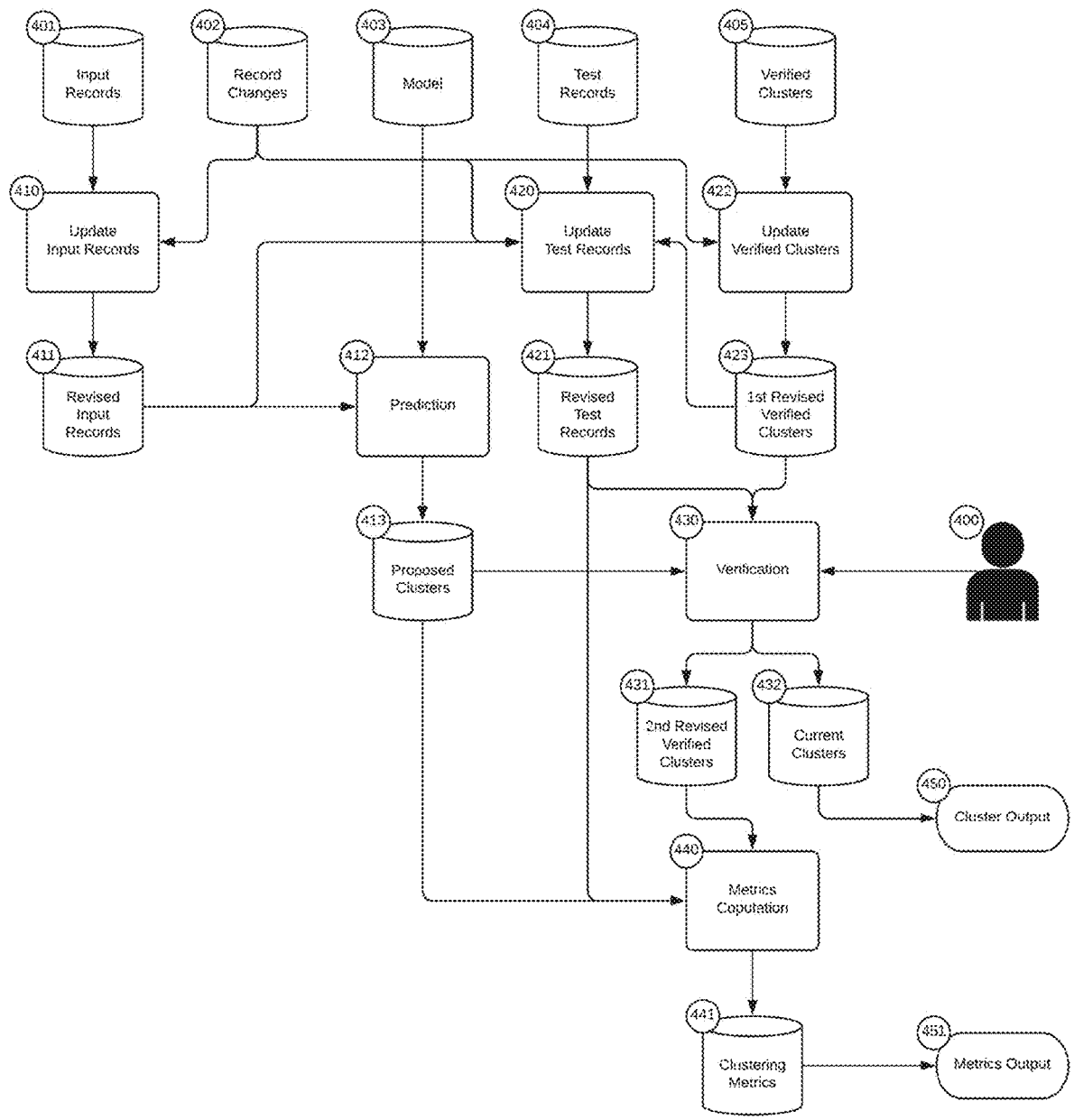

2.1. Detailed Workflow for Producing a Record Clustering with Record-Based Clustering Metrics FIG. 2 presents the detailed workflow for producing a record clustering with record-based clustering metrics. This workflow is as follows:

1. Update
   a. Update input records (410) takes a collection of input records (401) and a collection of record changes (402) and produces revised input records (411).
   b. Update verified records (422) takes a collection of verified records (405) and a collection of record changes (402) and produces a 1st revised verified records (423).
   c. Update test records (410) takes a collection of test records (420), record changes (402), 1st revised verified records (423), and revised input records (411) and produces revised test records (421).
2. Prediction
   a. Prediction (412) applies a model (403) to the revised input records (411) to produce proposed clusters (413)
3. Verification
   a. Verification (430) presents to the operator (400) the proposed clusters (413), revised test records (421), and 1st revised verified records (423), and allows the operator make changes if required. The operator saves the result as a 2nd revised verified records (431) and current clusters (432). This process of working with proposed clusters which replace current clusters is described in U.S. patent application Ser. No. 16/706,086, now U.S. Patent Application Publication No. 2022-0004565 (Webber et al.), which is incorporated by reference herein, and thus is not described in any further detail herein. The operator may be required to verify some or all proposed clusters that contain revised test records before proceeding.
   b. The current clusters (432) is the record clustering output (450) produced by the system.
4. Metrics computation
   a. Metrics computation (440) takes proposed clusters (413), revised test records (421), and 2nd revised verified records (431), and produces clustering metrics (441).
   b. The clustering metrics (441) is the metrics output (451) produced by the system.

2.2. Update Input Records and Verified Records

The input records contain a collection of input records, and this collection is updated to reflect the changes described in the record changes, which contains a collection of record changes, wherein each record change specifies an action to CREATE, UPDATE, or DELETE a record. Methods to update a collection of records according to a collection of record changes is described by such existing standards as CRUD and REST. A CREATE action causes the accompanying record to be added to the collection; a DELETE action causes the specified record to be removed from the collection, and an UPDATE action replaces the specified record in the collection with a version that is revised according to the update description.

In addition to the above standard processing, whenever a record is added to the collection of input records, the timestamp at which it is added is recorded. Thus each input record in the collection of input records also has a timestamp recording the time at which it was added to the collection; these timestamps are used in stratified sampling. Note that an UPDATE action does not impact the timestamp recording when the input record was added to the collection of input records.

The verified records contain a collection of records with verified cluster membership. Each record in the collection of records with verified cluster membership refers to a record in the collection of input records. The collection of records with verified cluster membership is updated to remove those records with verified cluster membership that refer to records in the collection of input records that have been removed. This is accomplished by processing DELETE actions in the collection of record changes.

Note that none of the collections of records in the input records, record changes, test records, or verified records is sensitive to the particular schema of the records in the collection. This allows the system to accommodate records with heterogeneous schemas within a single collection, and to accommodate schema changes over time.

2.3. Update Test Records 2.3.1. Test Records

A typical supervised machine learning workflow uses three datasets: a training dataset, a validation dataset, and a test dataset. The test records correspond to the test dataset, and metrics computation uses the test records to determine which proposed, current, and verified clusters to examine. In a machine learning workflow with supervised learning, the test records is treated as a holdout set that is not used in model training or in another way that might influence prediction.

2.3.2. Record Change Processing

The test records contain a collection of test records. Each test record in the collection of test records refers to a record in the collection of input records. The collection of test records is updated to remove those test records that refer to records in the collection of input records that have been removed. This is accomplished by processing DELETE actions in the collection of record changes.

Removing test records will impact the confidence interval of the clustering accuracy metrics. Deleted test records do not need to be tracked (e.g., via tombstones) since they will not contribute to the clustering accuracy metrics. If these records are re-added in a subsequent record change the system does not automatically re-add them as test records, though input record sampling may select them to add to the collection of test records.

2.3.3. Input Record Sampling

The collection of test records is maintained as a sample of the revised input records. To avoid bias, the probability that any input record will be selected for the sample should be close to uniform.

One of the benefits of using a sample of the input records to form the test dataset is that the distribution, bias, and content of the sample remains valid when using different models to create a proposed clustering, e.g., in successive rounds of model training. For example, a proposed clustering P1 can be produced from a dataset using an initial model M1, and a set of test records created. The test records and their corresponding proposed clusters are then verified by the operator, which entails moving records in and out of the proposed clusters until their membership is complete and correct; this result is saved as the verified records and current clusters. The accuracy of P1 can then be estimated using the current method. A second proposed clustering P2 can then be produced from the same dataset using a different model M2, e.g. a model produced by training to correct over- or under-clustering in the results produced by M1. Verification can then start with the test records, verified records and current clusters produced by the run of the system with M1. In this scenario, the operator may find that no changes are required during verification, allowing verification to be completed quickly. Because P1 and P2 contain the same records, the test records that were a uniform random sample from P1 are also a uniform random sample from P2. The accuracy of P2 can then be estimated using the previously created test records, current clusters and verified records.

2.3.3.1. Verification Budget

In real-world scenarios, gathering ground truth is extremely expensive from the perspective of subject matter experts' time and effort, so the system should minimize the amount of ground truth required to meet accuracy goals. Thus, the test records include a verification budget, which specifies a number of test records in need of verification to be maintained in the collection of test records. The number of input records from the revised input records to be added to the collection of test records is determined by the verification budget, and the number of test records in need of verification in the first revised verified records. The number of test records in need of verification is subtracted from the verification budget, and the result is the number of input records to add to the test records, minimum zero. Thus, when verification begins, the number of test records will be equal to the verification budget.

In the preferred embodiment, the present invention is incorporated into a workflow for supervised machine learning, wherein model training is performed in successive rounds, where the accuracy of the clusterings produced by earlier rounds of training is expected to be lower than that of later rounds. When the system starts with an empty collection of test records, it specifies a small verification budget as it is willing to accept a correspondingly broad confidence interval for clustering accuracy metrics. On successive training rounds, the supervised machine learning system adjusts the verification budget, thereby incurring additional verification effort in each successive round, iteratively adding to the set of training records and supporting commensurately narrower confidence intervals for the estimated accuracy metrics. In the preferred embodiment where clustering metrics are used in conjunction with cluster-based supervised learning for entity resolution, combining verification for validation with verification for training has the result that the operator is given a single task to provide ground truth to serve the two functions, which aids efficiency.

This embodiment allots an initial budget of 15 test records per training round. With the expectation that the operator will verify ⅔ of the unverified test clusters each round, this results in a sample size of approximately 100 after 10 training rounds, the number of rounds at which the system is observed to converge on a consistently accurate model. A sample size of 100 yields a maximum 95% confidence interval of 0.196, which in practice is the broadest 95% confidence interval to be practically usable. The number of rounds required to accumulate 100 test records can be reduced by increasing the budget on successive rounds, when clusters are expected to be higher-quality and therefore easier to verify. Increasing the budget by 5 records in rounds after the first, to a maximum of 50, results in a sample size of approximately 100 after only 6 training rounds.

The result is a system that converges to a desired confidence interval over successive training rounds.

2.3.3.2. Stratified Sampling

A standard mechanism for maintaining the distribution of a sample across dataset changes is stratified sampling. For stratified sampling to be viable:

1. The number of strata should be relatively small compared to the number of records sampled; in particular, for stratified sampling to remain unbiased, each stratum should cover no less than 5% of the population.
2. Re-sampling is to be avoided. Once a stratum is created and sampled from, both the stratum and the test records sampled from it should remain static. Re-sampling would incur additional work to re-do verification for all affected test records.

Immutable strata can be created according to record addition time, assuming that the records added in the record changes are less than 10% of the size of the largest existing stratum. The test records contain a collection of strata with their corresponding start and end timestamps, arranged such that the timestamp ranges form a non-overlapping continuum from the earliest record addition timestamp to the latest record addition timestamp. Each stratum contains record added between its start timestamp (inclusive) and end timestamp (exclusive). Note that the last stratum can be implicit—it covers the time range from the first record addition timestamp not covered by an existing stratum, up to and including the latest record addition timestamp.

When the verification budget indicates that the number of test records to be added is greater than zero, the collection of strata is examined. If the number of records added since the most recent stratum end timestamp is 5% or more of the total record count before the most recent stratum end timestamp, then a new stratum is created with start timestamp equal to the end timestamp of the most recent stratum and an end timestamp equal to the current time. Otherwise, any records added after the end of the most recent stratum end timestamp are considered to belong to the most recent stratum. In this manner, each new stratum will contain at least 5% of the total corpus, while keeping the number of strata low relative to the number of test records. There are a number of allocation strategies to determine the number of sampled points in each stratum. The two most popular strategies are size-proportional and size-variance-proportional (a.k.a. Neyman allocation). Although the latter provides more optimal allocation in the sense that the variance of the estimates is going to be lower, it is difficult to compute or estimate the variance of strata, especially for these representing new records. The preferred embodiment uses size-proportional sample allocation, which aims to have sample size be proportional to stratum size.

The mean estimate of the entire population is defined as follows when using stratified sampling:

$$\overline{X}_s = \sum_{l=1}^{L} \frac{N_l \overline{X}_l}{N}$$
$$= \sum_{l=1}^{L} W_l \overline{X}_l$$

Where $W_l$ is the ratio between a stratum size to the entire population size, $\overline{X}_l$ is the stratum mean, $N_l$ is the stratum size, and $N$ is the total population size.

The variance estimate of the entire population is defined as follows when using stratified sampling:

$$S^2_{\overline{X}_s} = \sum_{l=1}^{L} W_l^2 \left(\frac{1}{n_l}\right)\left(1 - \frac{n_l}{N_l}\right) s_l^2$$

Where $n_l$ is the size of the sample drawn from stratum l, $N_l$ is the stratum size, and $s_l^2$ is the stratum sample variance.

The 95% confidence interval is equal to $$\overline{X}_s \pm 0.96\sqrt{s^2_{\overline{X}_s}}$$

Note that the sample drawn from each stratum does not have to be exactly proportional to the stratum size. Regardless of the exact sample sizes, the estimates are unbiased. However, the variance (and hence the confidence interval width) increases slightly when sample size is not exactly aligned with stratum size. This is important because in some cases it may not be possible to ensure that the sample sizes are proportional to the strata sizes before computing the clustering accuracy metrics. For example, consider having 5M input records and 700 test records in the system. If the record changes add 500K more records, 70 new test records will need to be sampled to maintain the same 95% confidence interval. If the verification budget is 50, then fewer test records will be sampled from the second stratum than the target size. In this case, the weight associated with the sample variance of the second stratum $S^2_2$, which is equal to $$W_2^2 \left(\frac{1}{n_2}\right)\left(1 - \frac{n_2}{N_2}\right),$$

where $n_2=50$, will be greater than the weight in the case of having the optimal sample size where $n_2=70$. Note that as the user generates more test records, it should be possible to achieve this optimal sample allocation, and hence reduce the variance.

Sampling from within a stratum can be done using any standard sampling method, such as reservoir sampling.

2.3.3.3. Pseudocode

When the system needs to add test records, it first updates the stratification boundaries if needed. Then, the system computes the optimal sample size for each stratum which is equal to (the current test records count+the new test records count)*(stratum size/total number of records). Finally, the system computes the number of records that need to be sampled from each stratum which is equal to (the optimal sample size)–(the number of current test records in the stratum).

Note that current test records may include both verified and unverified test records. Strata with negative required sample sizes are ignored (i.e., each stratum that is already well covered using the current test records). Records are sampled from the remaining strata where the sampling probability is proportional to the required sample size per stratum.

Procedure add_test_records
Input
a. Revised input records
b. Current strata, where each stratum is defined as a record addition timestamp range
c. Previous test records
d. The number of test records to add
Output
a. Revised strata
b. Revised test records
Method
1. If the current strata is empty then
   a. create a single stratum that contains all existing records and add it to the current strata, creating revised strata
2. else
   a. Set num_added to the number of records in the revised input records with added timestamp after the most recent stratum end timestamp
   b. Set num_old to the number of records in the revised input records with added timestamp prior to the most recent stratum end timestamp c. If num_added is less than 5% of num_old, consider the records with added timestamp after the most recent stratum end timestamp to be members of the stratum with the most recent end timestamp; the revised strata are equal to the current strata. Otherwise, create a new stratum with start timestamp equal to the most recent stratum end timestamp, and end timestamp equal to the current time, thereby creating revised strata 3. For each stratum 1, compute requires_size(1) as to the number of existing test records in stratum 1−(the number of test records to add*the number of records in stratum 1/total number of records).

4. For each stratum with non-negative required sample size, randomly select this number of records from all records in the stratum that were not previously selected.

5. Add all newly sampled test records to the existing set of test records.

6. Return the revised strata (i.e., output of step 1), and the revised test records.

2.3.3.4. Experimental Results for Stratified Sampling

Figure 3:
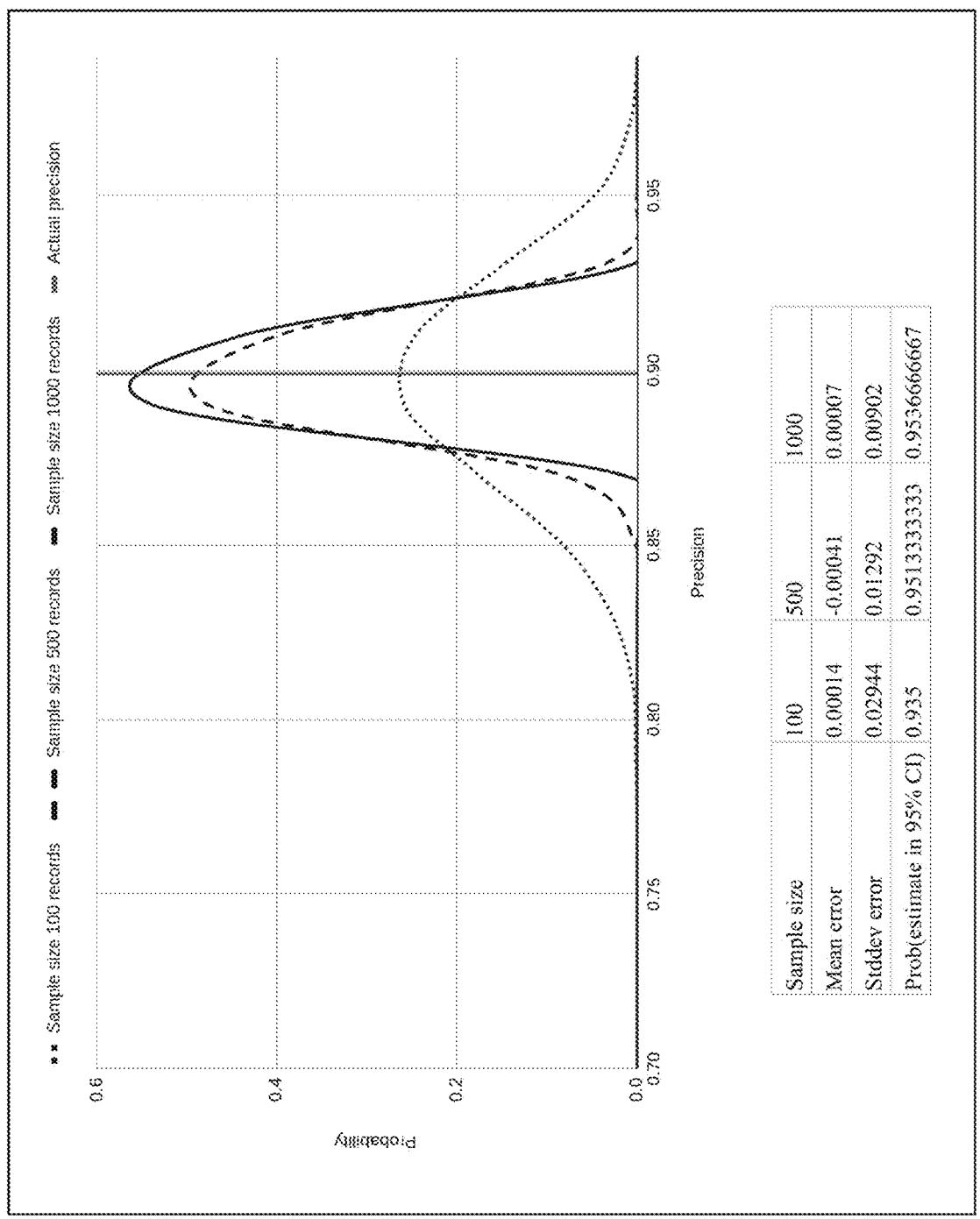
Figure 4:
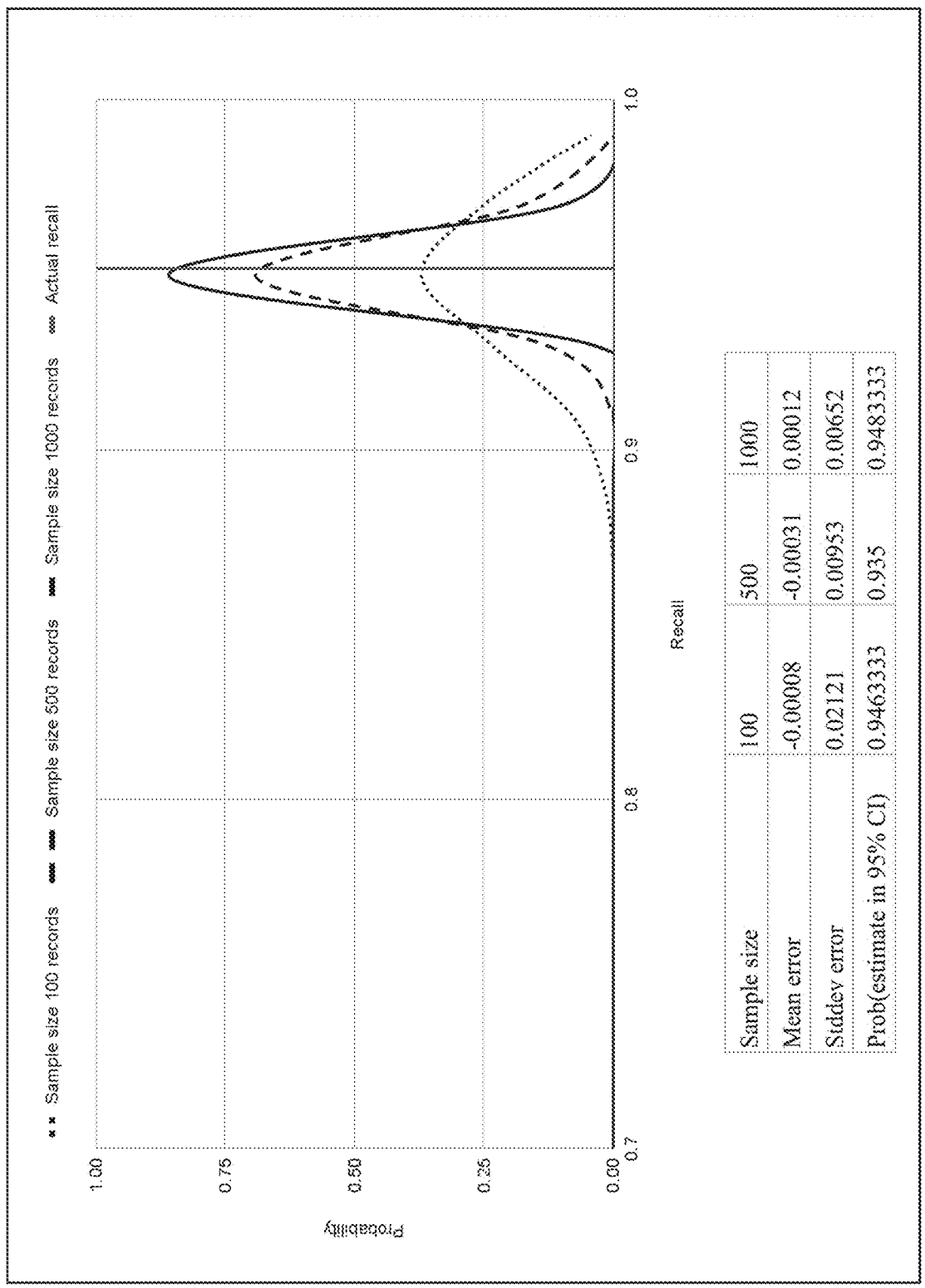
Figure 5:
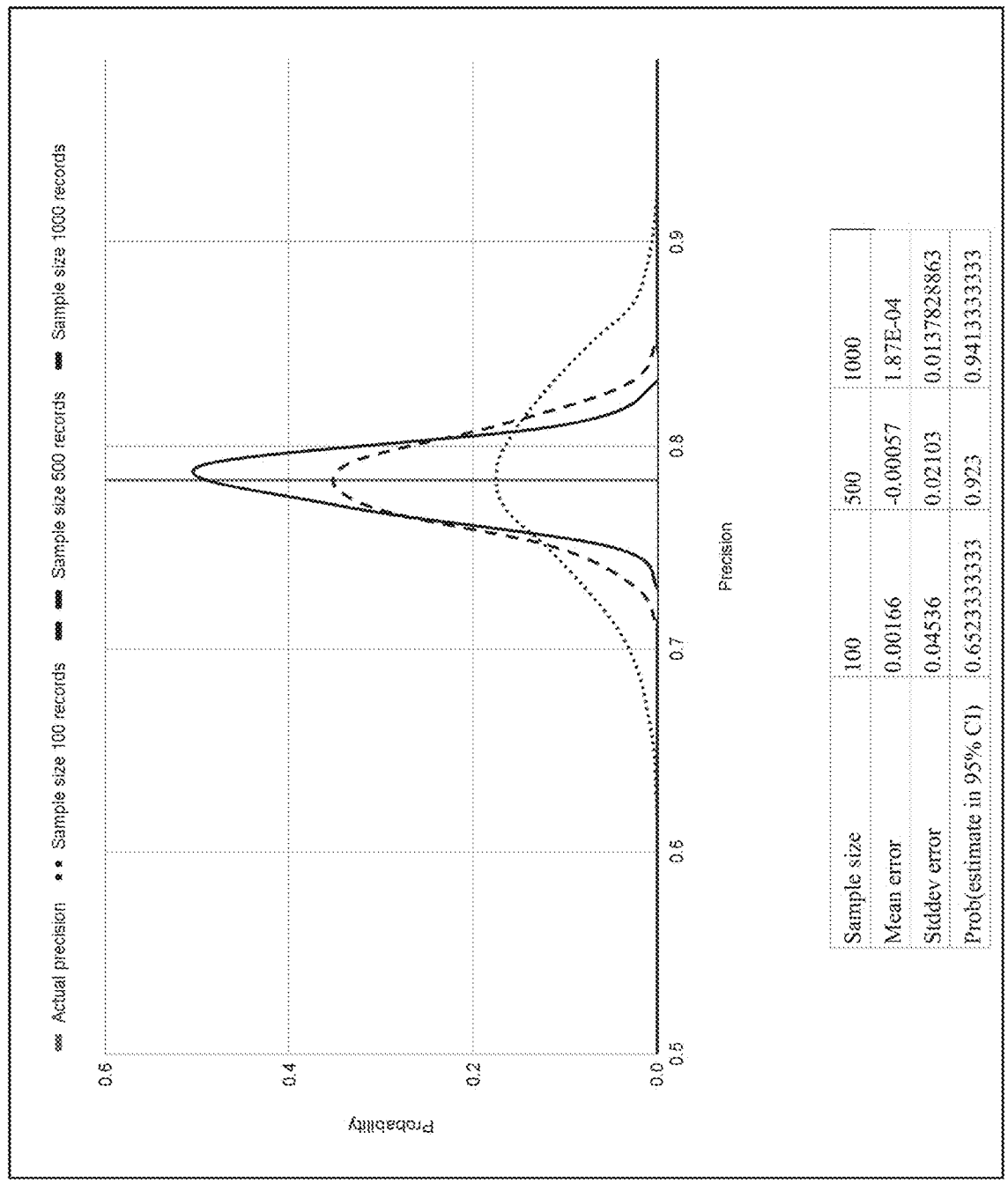

Two experiments used a Febrl dataset with 100,000 records to simulate data changes by splitting the true clusters into generations, one experiment with 3 generations and one with 100. Each generation represents one stratum. Each generation was clustered using a separate model to simulate the potential difference in model quality across data changes. FIG. 3 shows the result of estimating precision using samples of size 100, 500, and 1000, as well as the actual precision. FIG. 4 shows the result of estimating recall using samples of size 100, 500, and 1000, as well as the actual recall. Results for the experiment with 100 generations were only slightly worse; FIG. 5 shows the result of estimating precision using sample sizes of 100, 500, and 1000, as well as the actual precision.

2.4. Verification

Verification presents the proposed clusters and verified records to the operator in a user interface, wherein the proposed clusters whose membership includes test records in need of verification are flagged for verification. In the verification user interface, the operator moves records between clusters to ensure that the test records are placed in correct clusters, wherein any cluster containing a test record contains all of the records that should be clustered with the test record, and no records that should not be clustered with the test record.

In the preferred embodiment, the system also provides tools to assist the operator in finding all records that should be clustered with test records, such as:
  i. Record search, which allows the operator to use keywords to find candidate records that can then be verified as members of the cluster;
  ii. Related clusters, wherein the user interface presents a cluster for verification, and also provides the ability to view any clusters with overlapping membership in the proposed clusters or verified records, or that have non-trivial inter-cluster similarity with the cluster being verified. In a preferred embodiment using well-tuned pair generation, it is useful to use a threshold of 0 for inter-cluster similarity for related clusters.

When the operator saves the result of verification, the output is twofold:
1. Verified records, consisting of records with verified cluster membership. Only those input records for which the operator has verified the correct cluster membership are represented in the verified records.
2. Current clusters, consisting of records with current cluster membership. The current cluster membership is equal to the verified cluster membership when the record has a verified cluster membership, otherwise it is equal to the record's proposed cluster membership. All of the revised input records are represented in the current clusters, which forms the record clustering output of the system.

2.4.1. Selecting Clusters for Verification

When presenting clusters to the operator for verification, it is not sufficient to present only those clusters that contain the test records. The system also needs to present related clusters whose records have overlapping proposed cluster membership or verified cluster membership with respect to the test records. This ensures sufficient coverage of verified records for computing the most frequent verified clusters for proposed clusters of the test records, and the most frequent proposed clusters for verified clusters of the test records.

Procedure test_records_in_need_of_verification obtains the records that require verification in order to contribute to the clustering metrics. The verification user interface uses this method to highlight these test records so that the operator can verify them, thereby allowing them to contribute to the clustering metrics.

Procedure select_clusters_for_verification obtains the IDs of the proposed clusters that should be presented to the operator for verification, including proposed clusters that contain test records, verified clusters that contain test records, and related clusters. The records in these clusters are presented in a user interface showing their proposed and verified cluster membership.

Procedure test_records_in_need_of_verification
Input
Revised test records
Output
Collection of records that require verification
Method
Return all revised test records $r_i$ that satisfy any of the following conditions:
  a. $r_i$ has no verified cluster membership
  b. Given that $c_i$ is the proposed membership of ri, $m(c_i)$ cannot be determined, as described in procedure compute_clustering_metrics, or
  c. Given that $c^*_i$ is $r_i$'s verified cluster membership, $m^*(c^*_i)$ cannot be determined, as described in procedure compute_clustering_metrics Procedure select_clusters_for_verification
Input
a. Test records
b. Proposed clusters
c. Verified records
Output
Clusters for verification
Method
1. Select verified cluster IDs:
  a. Get all unique proposed cluster IDs that are associated with test records
  b. Get all records with proposed clusters in the set of cluster IDs obtained in step 1a.
  c. Get all unique verified cluster IDs that are associated with the records obtained in step 1b.
2. Select proposed cluster IDs
  a. Get all unique verified cluster IDs that are associated with test records
  b. Get all records with verified cluster IDs in the set of cluster IDs obtained in step 2a.
  c. Get all unique proposed cluster IDs associated with records obtained in steps 2b.

3. Return the distinct cluster IDs that are obtained in steps 1 and 2.

2.5. Record-Based Clustering Metrics

Bias in cluster precision and recall metrics due to cluster size and partial correctness is countered through use of a weighted average of cluster precision and recall, where the weight of each cluster is its size. The weighted average cluster precision is equivalent to the fraction of records that do not need to be moved out of their clusters to match the ground truth. Similarly, the weighted average cluster recall is the fraction of records that do not need to be merged into other clusters. These metrics are called "record-based clustering metrics" since they are metrics about clustering accuracy, and are proportional to the fraction of records exhibiting errors.

Record-based cluster precision and recall can be computed as follows, and is illustrated in FIG. 6. Let $r_i$ be a record; let $r_i$ be a member of cluster $c_i$ in the proposed clusters, denoted C, and let $r_i$ be a member of cluster $c_i^*$ in the ground truth, denoted C*. Define $m(c_i)$ as the cluster in C* that the most records in $c_i$ are members of. Similarly, define $m^*(c_i^*)$ as the cluster in C that the most records in $c_i^*$ are members of.

The following situations pertain to $c_i$ and $c_i^*$:

i. If $m(c_i)=c_i^*$ and $c_i=m^*(c_i^*)$ then record $r_i$ is a member of the same cluster in C* as the majority of records in $c_i$, and is a member of the same cluster in C as the majority of records in $c_i^*$. No change needs to be made for the current cluster of $r_i$ to align with the ground truth. In this case, define record $r_i$ as having neither a precision nor a recall error. This is illustrated in case (a) of FIG. 6.

ii. If $m(c_i) \neq c_i^*$ then record $r_i$ is a member of a cluster in C whose records are mostly not members of $c_i^*$. This indicates that $c_i$ represents a different entity than $c_i^*$, so $r_i$ would need to move to a different cluster in C* to match the ground truth, which is a precision error. This is shown in cases (b) and (d) in FIG. 6. Note that $m(c_i) \neq c_i^*$ does not necessarily imply that $c_i \neq m^*(c_i^*)$; this is shown in case (b) in FIG. 6.

iii. If $c_i \neq m^*(c_i^*)$ then record $r_i$ belongs to a verified cluster whose records are mostly members of a different cluster in C. This indicates that $c_i$ would need to be merged with a different cluster in order to match the ground truth, which is a recall error. This is shown in cases (c) and (d) in FIG. 6. Note that $c_i \neq m^*(c_i^*)$ does not necessarily imply that $m(c_i) \neq c_i^*$; this is shown in case (c) in FIG. 6.

iv. If both $m(c_i) \neq c_i^*$ and $c_i \neq m^*(c_i^*)$ then record $r_i$ has both precision and recall errors. This is shown in case (d) in FIG. 6.

One can therefore define record-based cluster precision as the fraction of records with precision errors, and record-based cluster recall as the fraction of records with recall errors. With these definitions of record-based cluster precision and recall, one can also define record-based cluster F1 using the standard formula of $F_1 = 2 * (precision*recall)/(precision+recall)$.

2.5.1. Evaluation of Record-Based Clustering Metrics

FIG. 7 compares record-based clustering metrics with other clustering metrics over successive rounds of active learning using cluster-based training for entity resolution in a 100,000 record dataset generated by Febrl. (see, Peter Christen et al. "A Parallel Open Source Data Linkage System." Proceedings of the 8th Pacific-Asia Conference, PAKDD 2004, Sydney, Australia, May 26-28, 2004. Pages 638-647. Springer Lecture Notes in Artificial Intelligence, Volume 3056.) The Febrl dataset generator also generates full ground truth so the actual values of the metrics are computed. The distribution of cluster sizes is close to a zipf distribution (shown in FIG. 8). For instance, the majority of the clusters are singletons, followed by clusters of size 2. Since singleton clusters do not have corresponding record pairs, their accuracy is underrepresented in pair-based metrics, as shown in graph (a) of FIG. 7, compared to record-based metrics, as shown in graph (c) of FIG. 7, which leads to underestimating the model accuracy. On the other hand, cluster-based metrics, shown in graph (b) of FIG. 7 have all clusters equally-weighted, which leads to larger clusters being underrepresented compared to record-based metrics, which leads to overestimating accuracy.

From these results, it is clear that record-based clustering metrics are not biased towards large or small clusters. Furthermore, having separate metrics for precision and recall provides the operator guidance as to whether a clustering fails to achieve an accuracy goal due to over-clustering or under-clustering, information the operator can use, for example, to guide training of a model intended to address the shortcoming.

2.5.2. Estimated Record-Based Clustering Metrics

In practice, producing full ground truth for large datasets requires a cost-prohibitive amount of effort. In these situations, estimated values can be used for the metrics if a reasonable confidence interval can be given for the accuracy of the estimated metrics. Such estimated record-based clustering accuracy metrics can be computed using the sample of ground truth embodied in the verified records corresponding to test records, using standard statistical estimation methods to compute estimated metrics with confidence intervals.

It is possible to compute a confidence interval of the estimated clustering metrics for a set of test records of a given size. For example, the 95% confidence interval is the range to which the actual metric is expected to belong 95% of the time for a random estimation run. The 95% confidence interval of an estimate (e.g., estimated record-based cluster precision) is defined as:

$$sample\_mean \pm 1.96 * sample\_stddev / sqrt(sample\_size)$$

Therefore, to accommodate estimated clustering metrics, the system has two options: (1) the target confidence interval can be specified, allowing the system to select a sample size that will yield the desired confidence interval (assuming the maximum sample_stddev of 0.5 since sample_stddev is unknown at this point); or (2) the sample size can be specified, allowing the system to describe the resulting confidence interval using the actual sample standard deviation. Since cluster verification is very costly, the preferred embodiment elects to control the sample size, and therefore the verification cost, and present clustering metrics to the operator with the resulting 95% confidence interval.

2.5.3. Computation of Estimated Record-Based Clustering Metrics

To compute estimated record-based clustering metrics, the proposed clusters are aligned with the current clusters as for computing exact record-based clustering metrics, but metrics computation is driven by test records. Estimated record-based cluster precision is computed for test records in the proposed clusters, and estimated record-based cluster recall is computed for test records in the verified records.

Note that, even though only test records are used for computing precision and recall, the other records that share a proposed or verified cluster membership with a test record are used for computing $m(c_i)$ and $m^*(c^*_i)$.

The result is estimated record-based cluster precision, recall and F1, with accompanying confidence interval.

In the preferred embodiment, these metrics are retained in a table over time, so the user can see how metrics change as the model changes and/or as the data changes.

2.5.4. Pseudocode

Procedure compute_clustering_metrics:

Input:
a. Test records
b. Proposed clusters
c. Verified records
d. Revised strata with record creation timestamp ranges
e. The number of test records in each revised stratum
f. The total number of records in each revised stratum Output:
a. Estimated record precision with confidence interval
b. Estimated record recall with confidence interval Method:
1. Create a set of triples $\{(r_i, c_i, c^*_i)\}$ by joining the test records with the proposed clusters and verified records, such that $r_i$ is a test record ID, $c_i$ is $r_i$'s proposed cluster ID, and $c^*_i$ is $r_i$'s verified cluster ID.
2. Let $W_j$ be the ratio between the number of records in stratum j and the total number of records the proposed clusters.
3. Compute estimated record precision $\overline{P}$ and its confidence interval $CI(\overline{P})$ as follows:
   a. Associate each test record $r_i$ with a precision indicator $P_i$ that is equal to
      i. null if the most frequent verified cluster $m(c_i)$ cannot be determined due to missing cluster verifications for records with proposed cluster equal to $c_i$. Specifically, $m(c_i)$ cannot be determined when the records with proposed cluster equal to $c_i$ have the frequency of the most frequent verified cluster less than the frequency of the second most frequent verified cluster (or zero if there is no such cluster) plus the number of records with missing cluster verifications.
      ii. 1 if its verified cluster $c^*_i$ is equal $m(c_i)$
      iii. 0 if its verified cluster $c^*_i$ is not equal $m(c_i)$
   b. Filter out test records with null precision indicators.
   c. For each stratum j, compute the mean $\overline{P}_j$ and the sample variance $s_{P_j}^2$ of the precision indicator for all test records in this stratum.
   d. Get the overall mean of record precision $\overline{P}$ which is equal to $\Sigma_{j=1}^{L} W_j \overline{P}_j$ where L is the total number of strata.
   e. Get the overall sample variance of the record precision $s_P^2$ which is equal to $$\sum_{j=1}^{L} W_j^2 \frac{1}{n_j}\left(1 - \frac{n_j}{N_j}\right) s_{P_j}^2,$$

where $n_j$ is the total number of records in stratum j and $N_j$ is the total number of records in stratum j.

f. Get the 95% precision confidence interval which is equal to $$CI(\overline{P}) = \left[\overline{P} - 1.96\sqrt{s_P^2}, \overline{P} + 1.96\sqrt{s_P^2}\right].$$

4. Compute estimated recall $\overline{R}$ and its confidence interval $CI(\overline{R})$ as follows:
   a. Associate each test record $r_i$ with a recall indicator $R(r_i)$ that is equal to
      i. 1 if its proposed cluster $c_i$ is equal $m^*(c^*_i)$
      ii. 0 if its proposed cluster $c_i$ is not equal $m^*(c^*_i)$
   b. For each stratum j, compute the mean $\overline{R}_j$ and the sample variance $s_{R_j}^2$ of the recall indicator for all test records in this stratum.
   c. Get the overall mean of record precision $\overline{R}$ which is equal to $\Sigma_{j=1}^{L} W_j \overline{R}_j$, where L is the total number of strata.
   d. Get the overall sample variance of the record recall $s_R^2$ which is equal to $$\sum_{j=1}^{L} W_j^2 \frac{1}{n_j}\left(1 - \frac{n_j}{N_j}\right) s_{R_j}^2,$$

where $n_j$ is the number of test records in stratum j and $N_j$ is the total number of records in stratum j.

e. Get the 95% recall confidence interval which is equal to $$CI(\overline{R}) = \left[\overline{R} - 1.96\sqrt{s_R^2}, \overline{R} + 1.96\sqrt{s_R^2}\right].$$

5. Return $\overline{P}$ as the estimated precision, $CI(\overline{P})$ as the confidence interval for the estimated precision, $\overline{R}$ as the estimated recall, and $CI(\overline{R})$ as the confidence interval for the estimated recall.

2.4.7. Experimental Results

Experiments were performed using a 100,000 record Febrl-generated dataset. Real-world scenarios show dramatic skew in cluster size, e.g., 200,000-record clusters in a 5,000,000-record dataset, so this dataset was generated using a modified version of Febrl that generates an extended range of cluster sizes. FIG. 8 shows the cluster size distribution and the number of records in each set of clusters with the same size in Febrl. FIG. 9 shows the probability distributions of the precision and recall estimates for various sample sizes for the first model trained. The distributions were computed by repeating the sampling process, for each sample size, 2000 times and plotting a 50-bin histogram for the sample means.

These results show that the computed estimates are unbaised. The estimation error mean is shown in Table 1 and Table 2 for precision and recall estimates, respectively. The standard deviation of the estimated errors decreases as the sample size increases which is consistent with the expectation that the standard deviation of the error is proportional to 1/sqrt(sample size). The 95% confidence intervals for each sample were verified to contain the actual value of the metric close to 95% of the time. The average widths of the confidence interval for the precision and recall estimate are shown in Table 1 and Table 2, respectively.

TABLE 1

Precision Estimate Statistics

| Sample size | Error mean | Absolute error mean | Error std deviation | 95% CI width |
|---|---|---|---|---|
| 100 | 0.00085 | 0.03818 | 0.04833 | 0.095 |

TABLE 1-continued

Precision Estimate Statistics

| Sample size | Error mean | Absolute error mean | Error std deviation | 95% CI width |
|---|---|---|---|---|
| 500 | 0.00015 | 0.01737 | 0.02156 | 0.043 |
| 1000 | 0.00072 | 0.01224 | 0.01528 | 0.030 |

TABLE 2

Recall Estimate Statistics

| Sample size | Error mean | Absolute error mean | Error std deviation | 95% CI width |
|---|---|---|---|---|
| 100 | 0.00085 | 0.02498 | 0.3184 | 0.060 |
| 500 | 0.00005 | 0.01126 | 0.01380 | 0.027 |
| 1000 | 0.00013 | 0.00799 | 0.00989 | 0.019 |

III. User Interface

Figure 10:
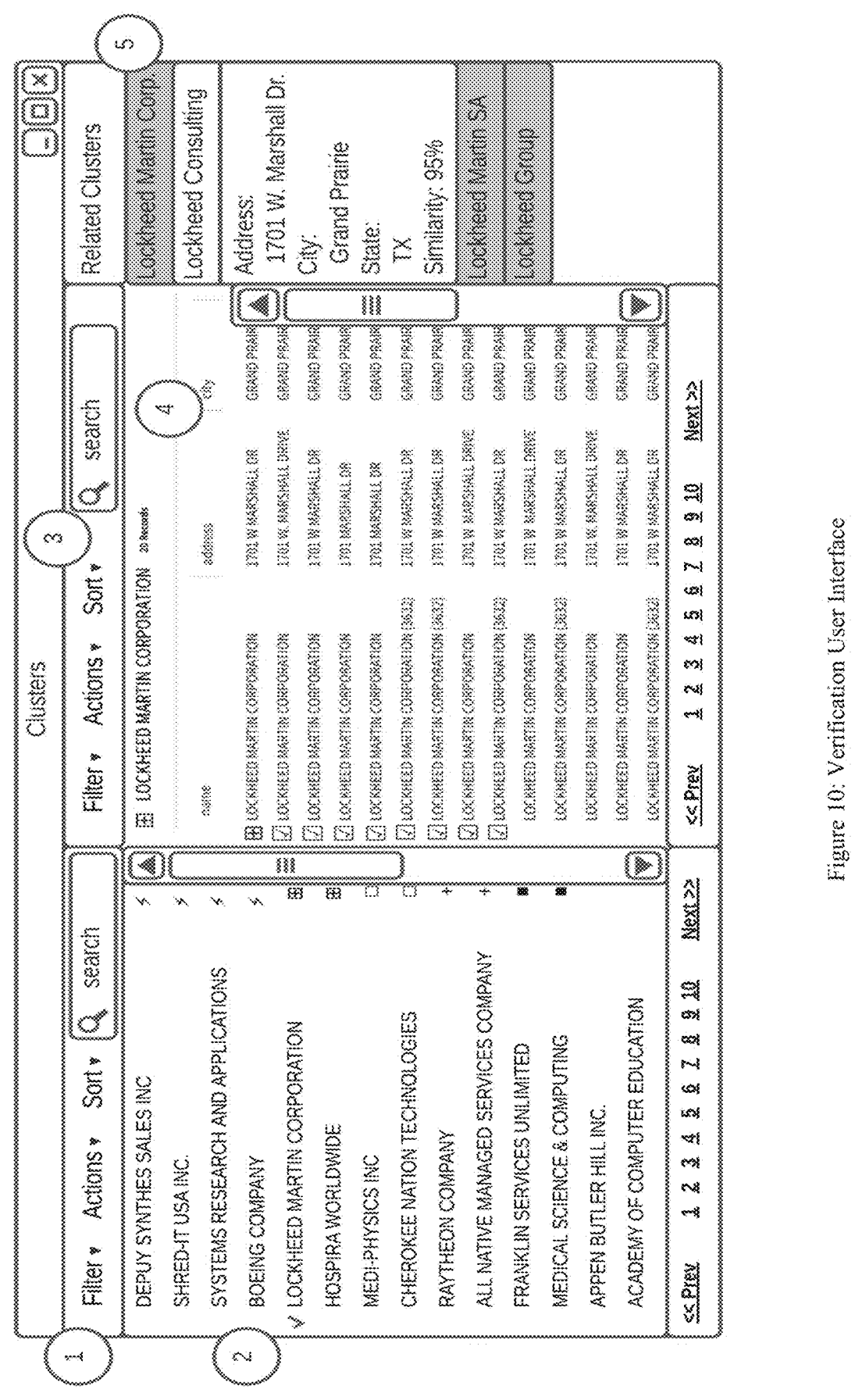

FIG. 10 presents an example user interface for verification showing:

1. Menu for cluster list, including menus for filtering clusters, taking actions such as verification on cluster, and sorting and searching clusters;
2. Cluster list, including:
   a. Clusters that contain test records in need of verification, marked with a lightning bolt, sorted first in the cluster list to bring them to the operator's attention,
   b. Clusters that contain test records with precision problems, marked with a plus, sorted before clusters without test records with problems to raise their visibility,
   c. Clusters that contain test records with recall problems, marked with an empty square, sorted before clusters without test records with problems to raise their visibility,
   d. Clusters that contain test records with precision problems and recall problems, indicated with a squared plus, sorted before clusters without test records with problems to raise their visibility,
   e. Clusters that contain test records with no problems, indicated with a filled square, sorted before clusters without test records to raise their visibility, and
   f. Showing that the cluster for Lockheed Martin Corporation is the currently selected cluster, indicated with a check mark.
3. Menu bar for record list, including menus for filtering records, taking actions such as verifying that the displayed records are members of the currently selected cluster, and sorting and searching records;
4. Record list, supporting gestures such as drag-and-drop to move a record to a cluster to verify it as a member of that cluster, and including:
   a. Squared plus in the record list header, indicating that the cluster contains test records with precision and recall problems,
   b. Squared plus on the first record, indicating that it is a test record with precision and recall problems,
   c. Squared check marks on other records, indicating that those records have been verified as members of this cluster.
5. Related Clusters, showing clusters that are related to cluster currently selected in the cluster list, and including:
   a. The second cluster expanded to show details and the relationship to the currently selected cluster FIG. 11 presents an example user interface for filtering the cluster list or record list, showing:

6. Filter menu for the cluster list, including
   a. The ability to filter to those clusters that contain test records that need verification
   b. The ability to filter to those clusters that contain test records with no problems, test records with precision problems, test records with recall problems, no test records, or any combination thereof
   c. The ability to filter to those clusters that contain only verified records, some verified records, or no verified records.
7. Filter menu for the record list, including
   a. The ability to filter to test records that need verification
   b. The ability to filter to test records that have no problems, test records with precision problems, test records with recall problems, records that are not test records, or any combination thereof
   c. The ability to filter to records that are verified or to records that are not verified FIG. 12 presents an example user interface for sorting the cluster list or record list, showing:

8. Sort menu for the cluster list, including
   a. The ability to sort clusters with test records first
9. Sort menu for the record list, including
   a. The ability to sort test records first FIG. 13 presents an example user interface for displaying clustering accuracy metrics, showing:

1. Estimated clustering precision trendline, showing both the estimated cluster precision over time and the 95% confidence interval over time,
2. Estimated clustering recall trendline, showing both the estimated clustering recall over time and the 95% confidence interval over time,
3. Current estimated clustering precision, and current 95% confidence interval,
4. Current estimated clustering recall, and current 95% confidence interval.

IV. Entity Relationships

FIG. 14 is a self-explanatory entity relationship diagram (ERD) in accordance with one preferred embodiment of the present invention.

The present invention may be implemented with any combination of hardware and software. If implemented as a computer-implemented apparatus, the present invention is implemented using means for performing all of the steps and functions described above.

When implemented in software, the software code can be executed on any suitable processor or collection of processors, whether provided in a single computer or distributed among multiple computers.

The present invention can also be included in an article of manufacture (e.g., one or more tangible computer program products) having, for instance, non-transitory computer readable storage media. The storage media has computer readable program code stored therein that is encoded with instructions for execution by a processor for providing and facilitating the mechanisms of the present invention. The article of manufacture can be included as part of a computer system or sold separately.

The storage media can be any known media, such as computer memory, one or more floppy discs, compact discs, optical discs, magnetic tapes, flash memories, circuit configurations in Field Programmable Gate Arrays or other semiconductor devices, or other tangible computer storage medium. The storage media can be transportable, such that the program or programs stored thereon can be loaded onto one or more different computers or other processors to implement various aspects of the present invention as discussed above.

The computer(s)/processor(s) used herein may be embodied in any of a number of forms, such as a rack-mounted computer, a desktop computer, a laptop computer, or a tablet computer. Additionally, a computer may be embedded in a device not generally regarded as a computer but with suitable processing capabilities, including a Personal Digital Assistant (PDA), a smart phone or any other suitable portable, mobile, or fixed electronic device.

Such computers/processors may be interconnected by one or more networks in any suitable form, including as a local area network or a wide area network, such as an enterprise network or the Internet. Such networks may be based on any suitable technology and may operate according to any suitable protocol and may include wireless networks, wired networks or fiber optic networks.

The various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

The terms "program" or "software" are used herein in a generic sense to refer to any type of computer code or set of computer-executable instructions that can be employed to program a computer or other processor to implement various aspects of the present invention as discussed above. The computer program need not reside on a single computer or processor, but may be distributed in a modular fashion amongst a number of different computers or processors to implement various aspects of the present invention.

Computer-executable instructions may be in many forms, such as program modules, executed by one or more computers or other devices. Generally, program modules include routines, programs, objects, components, data structures, and the like, that perform particular tasks or implement particular abstract data types. The functionality of the program modules may be combined or distributed as desired in various embodiments.

Data structures may be stored in non-transitory computer-readable media in any suitable form. For simplicity of illustration, data structures may be shown to have fields that are related through location in the data structure. Such relationships may likewise be achieved by assigning storage for the fields with locations in a non-transitory computer-readable medium that conveys relationship between the fields. However, any suitable mechanism may be used to establish a relationship between information in fields of a data structure, including through the use of pointers, tags or other mechanisms that establish relationship between data elements.

The scope of the present invention thus further includes a tangible computer program product for cluster selection, wherein the computer program product comprises non-transitory computer-readable media encoded with instructions for execution by a processor to perform the methods described above.

Preferred embodiments of the present invention may be implemented as methods, of which examples have been provided. The acts performed as part of the methods may be ordered in any suitable way. Accordingly, embodiments may be constructed in which acts are performed in an order different than illustrated, which may include performing some acts simultaneously, even though such acts are shown as being sequentially performed in illustrative embodiments.

Various embodiments of the invention have been presented above. However, the invention is not intended to be limited to the specific embodiments presented, which have been presented for purposes of illustration. Rather, the invention extends to functional equivalents as would be within the scope of the appended claims. Those skilled in the art, having the benefit of the teachings of this specification, may make numerous modifications without departing from the scope and spirit of the invention in its various aspects.

What is claimed is:

1. A method of producing a record clustering with estimated accuracy metrics with confidence intervals, the method using:
   (i) a collection of input records,
   (ii) a model that is applied to a collection of records to produce a proposed cluster membership for each record in the collection,
   (iii) a collection of record changes, wherein each record change is an add, update or delete and wherein updates and deletes reference records in the collection of input records,
   (iv) a collection of test records, wherein each test record is a member of the collection of input records, and
   (vi) a collection of verified records, wherein each verified record has a verified cluster membership and wherein each verified record is a member of the collection of input records, the method comprising:
(a) incorporating, using software code in a processor, the record changes in the collection of record changes into:
   (i) the collection of input records, thereby producing revised input records, and
   (ii) the collection of verified records, thereby producing first revised verified records, and
   (iii) the collection of test records, thereby producing first revised test records;
(b) creating, using the software code in the processor, a proposed cluster membership for each of the input records in the revised input records using the model, thereby producing proposed clusters;
(c) selecting a sample of the input records from the revised input records to add to the first revised test records, using the first revised verified records, thereby producing second revised test records;
(d) displaying to a user, on a user interface display, the following records:
   (i) the test records in the second revised test records that are in need of verification,
   (ii) the records in the proposed clusters whose proposed cluster membership is a related cluster, and
   (iii) the records in the first revised verified records whose verified cluster membership is a related cluster;

(e) the user indicating, via the user interface display, for one or more of the records displayed in the user interface display, whether the records are members of a cluster;

(f) creating, based on the user indications in step (e), using the software code in the processor, second revised verified records and current clusters, the current clusters being the record clustering; and (g) computing, using the software code in a processor, estimated accuracy metrics for the record clustering with confidence intervals from the second revised test records, using the proposed clusters, and the second revised verified records.

2. The method of claim 1 wherein the sample of the input records is selected by stratified sampling.

3. The method of claim 2 wherein the strata used in stratified sampling are defined by record creation time.

4. The method of claim 2 wherein a new stratum to be used in the stratified sampling is created when the number of records added since the most recent stratum end timestamp is over a threshold of the total record count before the most recent stratum end timestamp.

5. The method of claim 1 wherein the estimated clustering metrics are record-based precision and recall.

6. The method of claim 1 wherein the size of the sample of the input records is determined by a verification budget.

7. The method of claim 1 wherein test records in need of verification includes test records where the most frequent verified record cannot be determined.

8. A computer program product for producing a record clustering with estimated accuracy metrics with confidence intervals, the computer program product using:
   (i) a collection of input records,
   (ii) a model that is applied to a collection of records to produce a proposed cluster membership for each record in the collection,
   (iii) a collection of record changes, wherein each record change is an add, update or delete and wherein updates and deletes reference records in the collection of input records,
   (iv) a collection of test records, wherein each test record is a member of the collection of input records, and
   (vi) a collection of verified records, wherein each verified record has a verified cluster membership and wherein each verified record is a member of the collection of input records,
the computer program product comprising a non-transitory computer-readable storage medium tangibly embodying non-transitory computer-executable program instructions thereon that, when executed, causes a computing device to:
(a) incorporate the record changes in the collection of record changes into:
   (i) the collection of input records, thereby producing revised input records, and
   (ii) the collection of verified records, thereby producing first revised verified records, and
   (iii) the collection of test records, thereby producing first revised test records;
(b) create a proposed cluster membership for each of the input records in the revised input records using the model, thereby producing proposed clusters;
(c) selecting a sample of the input records from the revised input records to add to the first revised test records, using the first revised verified records, thereby producing second revised test records;
(d) display to a user, on a user interface display, the following records:
   (i) the test records in the second revised test records that are in need of verification,
   (ii) the records in the proposed clusters whose proposed cluster membership is a related cluster, and
   (iii) the records in the first revised verified records whose verified cluster membership is a related cluster;
(e) receive user indications, via the user interface display, for one or more of the records displayed in the user interface display, regarding whether the records are members of a cluster;
(f) create, based on the user indications in step (e), second revised verified records and current clusters, the current clusters being the record clustering; and
(g) compute estimated accuracy metrics for the record clustering with confidence intervals from the second revised test records, using the proposed clusters, and the second revised verified records.

9. The computer program product of claim 8 wherein the sample of the input records is selected by stratified sampling.

10. The computer program product of claim 9 wherein the strata used in stratified sampling are defined by record creation time.

11. The computer program product of claim 9 wherein a new stratum to be used in the stratified sampling is created when the number of records added since the most recent stratum end timestamp is over a threshold of the total record count before the most recent stratum end timestamp.

12. The computer program product of claim 8 wherein the estimated clustering metrics are record-based precision and recall.

13. The computer program product of claim 8 wherein the size of the sample: of the input records is determined by a verification budget.

14. The computer program product of claim 8 wherein test records in need of verification includes test records where the most frequent verified record cannot be determined.

* * * * *